(12) United States Patent
Kamei et al.

(10) Patent No.: US 11,517,022 B2
(45) Date of Patent: *Dec. 6, 2022

(54) INTERNAL AIR ADJUSTMENT DEVICE

(71) Applicant: DAIKIN INDUSTRIES, LTD., Osaka (JP)

(72) Inventors: Noritaka Kamei, Osaka (JP); Naohiro Tanaka, Osaka (JP); Hidenori Matsui, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 316 days.

This patent is subject to a terminal disclaimer.

(21) Appl. No.: 16/651,991

(22) PCT Filed: Sep. 27, 2018

(86) PCT No.: PCT/JP2018/036056
§ 371 (c)(1),
(2) Date: Mar. 27, 2020

(87) PCT Pub. No.: WO2019/065889
PCT Pub. Date: Apr. 4, 2019

(65) Prior Publication Data
US 2020/0253227 A1 Aug. 13, 2020

(30) Foreign Application Priority Data

Sep. 29, 2017 (JP) .............................. JP2017-189947

(51) Int. Cl.
*A23B 7/148* (2006.01)
*A23B 7/04* (2006.01)
(Continued)

(52) U.S. Cl.
CPC ................ *A23B 7/148* (2013.01); *A23B 7/04* (2013.01); *B01D 53/047* (2013.01);
(Continued)

(58) Field of Classification Search
None
See application file for complete search history.

(56) References Cited

U.S. PATENT DOCUMENTS

| 5,438,841 | A | | 8/1995 | Cahill-O'Brien et al. |
| 5,457,963 | A | * | 10/1995 | Cahill-O'Brien ..... F25D 17/042 |
| | | | | 99/468 |

(Continued)

FOREIGN PATENT DOCUMENTS

| CN | 101019682 A | 8/2007 |
| EP | 0 489 440 A2 | 6/1992 |

(Continued)

OTHER PUBLICATIONS

English language machine translation for JP 2002-274608. Provided by Applicants in co-pending U.S. Appl. No. 16/651,942, filed Mar. 27, 2020. (Year: 2020).*

(Continued)

*Primary Examiner* — Jason M Greene
(74) *Attorney, Agent, or Firm* — Birch, Stewart, Kolasch & Birch, LLP

(57) ABSTRACT

An internal air adjustment device that includes a first composition adjustment unit and a second composition adjustment unit. The first composition adjustment unit separates supply air from external air, the supply air having a composition that differs from a composition of the external air, and supplies the supply air into a transport container. The second composition adjustment unit separates discharge air from internal air, the discharge air having a composition that differs from a composition of the internal air, and discharges the discharge air to outside of the transport container. The internal air adjustment device is capable of properly controlling the composition of the internal air in the transport container.

18 Claims, 10 Drawing Sheets

(51) Int. Cl.
  *B01D 53/04* (2006.01)
  *B01D 53/047* (2006.01)
  *B01D 53/22* (2006.01)
  *B01D 53/30* (2006.01)
  *F25D 17/04* (2006.01)
  *A01F 25/14* (2006.01)

(52) U.S. Cl.
  CPC ....... *B01D 53/0423* (2013.01); *B01D 53/229* (2013.01); *B01D 53/30* (2013.01); *F25D 17/042* (2013.01); *A01F 25/14* (2013.01); *A23V 2002/00* (2013.01); *B01D 2053/224* (2013.01); *B01D 2253/108* (2013.01); *B01D 2257/102* (2013.01); *B01D 2259/4566* (2013.01); *F25D 2317/041* (2013.01)

(56) References Cited

U.S. PATENT DOCUMENTS

| | | | |
|---|---|---|---|
| 2015/0047502 | A1 | 2/2015 | Heirman |
| 2017/0127705 | A1 | 5/2017 | Cermak et al. |
| 2018/0252461 | A1* | 9/2018 | Kamei .................. F25D 17/067 |

FOREIGN PATENT DOCUMENTS

| | | | | |
|---|---|---|---|---|
| JP | 4-75575 | * | 3/1992 | ............ B01D 53/22 |
| JP | 4-75575 | A | 3/1992 | |
| JP | 4-110581 | A | 4/1992 | |
| JP | 4-278047 | A | 10/1992 | |
| JP | 8-168 | A | 1/1996 | |
| JP | 2002-274608 | * | 9/2002 | ............ B01D 53/22 |
| JP | 2010-246475 | A | 11/2010 | |
| JP | 2013-202085 | * | 10/2013 | ............ F25D 23/02 |
| JP | 2013-202085 | A | 10/2013 | |
| JP | 2015-14445 | A | 1/2015 | |
| WO | WO 2007/033668 | A1 | 3/2007 | |
| WO | WO 2017/038055 | A1 * | 3/2017 | ............ F25D 23/00 |
| WO | WO 2017/038055 | A1 | 3/2017 | |

OTHER PUBLICATIONS

International Search Report for PCT/JP2018/036056 (PCT/ISA/210) dated Dec. 18, 2018.

Extended European Search Report for European Application No. 18860732.9, dated Apr. 6, 2021.

* cited by examiner

INTERNAL AIR ADJUSTMENT DEVICE

TECHNICAL FIELD

The present invention relates to an internal air adjustment device that adjusts the composition of internal air in a storage.

BACKGROUND ART

A known internal air adjustment device adjusts, for the purpose of suppressing loss of freshness of, for example, agricultural products, the composition of internal air (such as the oxygen concentration or the carbon dioxide concentration of the internal air) in a storehouse or a transport container, each accommodating agricultural products or the like.

Patent Document 1 discloses a container that is provided with a device that adjusts the composition of internal air. The device in Patent Document 1 adjusts the composition of internal air by using a gas separation membrane in which the passability of carbon dioxide is higher than the passability of oxygen. Specifically, this device discharges carbon dioxide produced by the respiration of, for example, agricultural products out from the container as a result of the internal air coming into contact with one surface of the gas separation membrane, and outside air that hardly contains carbon dioxide coming into contact with the other surface of the gas separation membrane (refer to line 14, page 20 to line 2, page 21 of the description of Patent Document 1). This device is configured so that, when the oxygen concentration inside the container is reduced, a passage that connects the inside and the outside of the container to each other opens and the outside air flows into the container via the passage (refer to lines 5 to 12, page 20 of the description of Patent Document 1).

CITATION LIST

Patent Document

PTL 1: International Publication WO 2007/033668

SUMMARY OF INVENTION

Technical Problem

Here, depending upon the types of goods, such as agricultural products, that are accommodated in a container, the composition of internal air suitable for storage thereof varies. On the other hand, as described above, the device in Patent Document 1 discharges carbon dioxide that is contained in the internal air to the outside of the container, and introduces outside air into the container via the passage that allows the inside and the outside of the container to communicate with each other. That is, the device in Patent Document 1 supplies air having a composition that is the same as the composition of the atmosphere (that is, outside air) into the container. Therefore, it may be difficult to adjust the composition of the internal air to a composition suitable for storage of goods, such as agricultural products, that are accommodated in the container.

The present invention has been made in view of such points, and its object is to provide an internal air adjustment device that is capable of properly controlling the composition of internal air in a storage.

Solution to Problem

A first aspect of the present disclosure is directed to an internal air adjustment device that adjusts a composition of internal air existing inside a storage (1). The internal air adjustment device includes a first composition adjustment unit (40) that includes a first separation unit (41) that separates supply air from external air existing outside the storage (1), the supply air having a composition that differs from a composition of the external air, the first composition adjustment unit (40) supplying the supply air into the storage (1); and a second composition adjustment unit (60) that includes a second separation unit (61) that separates discharge air from the internal air existing inside the storage (1), the discharge air having a composition that differs from the composition of the internal air, the second composition adjustment unit (60) discharging the discharge air to outside of the storage (1).

The internal air adjustment device (30) of the first aspect adjusts the composition of air existing inside the storage (1) by causing the first composition adjustment unit (40) supplying the supply air having a composition that differs from the composition of the external air into the storage (1) and by causing the second composition adjustment unit (60) discharging the discharge air having a composition that differs from the composition of the internal air to the outside of the storage (1). In this aspect, the second composition adjustment unit (60) discharges the discharge air separated from the internal air to the outside of the storage (1), whereas the first composition adjustment unit (40) supplies the supply air separated from the external air into the storage (1).

In a second aspect of the present disclosure based on the first aspect, the first composition adjustment unit (40) supplies the supply air into the storage (1) so that air pressure inside the storage (1) differs from air pressure outside the storage (1).

In the second aspect, the air pressure inside the storage (1) has a value that differs from the value of the air pressure outside the storage (1). That is, in this aspect, the air pressure inside the storage (1) is regulated.

In a third aspect of the present disclosure based on the first aspect, the first composition adjustment unit (40) supplies the supply air into the storage (1) so that air pressure inside the storage (1) becomes positive.

In the third aspect, the first composition adjustment unit (40) supplies the supply air into the storage (1) so that the air pressure inside the storage (1) becomes positive. Air flows from a place of high air pressure to a place of low air pressure. Therefore, even if the airtightness of the storage (1) is low, as along as the air pressure inside the storage (1) is kept positive, the external air will not enter the inside of the storage (1) from a gap of the storage (1).

In a fourth aspect of the present disclosure based on the third aspect, a flow rate of the supply air that is supplied into the storage (1) by the first composition adjustment unit (40) is higher than a flow rate of the discharge air that is discharged to the outside of the storage (1) by the second composition adjustment unit (60).

In the fourth aspect, since the flow rate of the supply air that is supplied into the storage (1) by the first composition adjustment unit (40) is higher than the flow rate of the discharge air that is discharged to the outside of the storage (1) by the second composition adjustment unit (60), the air pressure inside the storage (1) becomes positive.

In a fifth aspect of the present disclosure based on any one of the first aspect to the fourth aspect, a carbon dioxide concentration reduction operation of reducing a carbon dioxide concentration of the internal air in the storage (1) is performed by causing the second separation unit (61) of the second composition adjustment unit (60) to separate the discharge air from the internal air existing inside the storage (1), the discharge air having a carbon dioxide concentration that is higher than the carbon dioxide concentration of the internal air.

In the fifth aspect, the internal air adjustment device (30) performs the carbon dioxide concentration reduction operation. In the carbon dioxide concentration reduction operation, the discharge air having a carbon dioxide concentration that is higher than the carbon dioxide concentration of the internal air inside the storage (1) is separated from the internal air, and the discharge air is discharged to the outside of the storage (1). As a result, the amount of carbon dioxide existing inside the storage (1) is reduced, and the carbon dioxide concentration of the internal air is reduced. The carbon dioxide concentration reduction operation is performed for reducing the carbon dioxide concentration of the internal air when, for example, the carbon dioxide concentration of the internal air is increased by the respiration of plants accommodated in the storage (1).

In a sixth aspect of the present disclosure based on any one of the first aspect to the fourth aspect, an oxygen concentration reduction operation of reducing an oxygen concentration of the internal air in the storage (1) is performed by causing the first separation unit (41) of the first composition adjustment unit (40) to separate the supply air from the external air existing outside the storage (1) and the second separation unit (61) of the second composition adjustment unit (60) to separate the discharge air from the internal air, the supply air having an oxygen concentration that is lower than an oxygen concentration of the external air, the discharge air having an oxygen concentration that is higher than the oxygen concentration of the internal air.

In the sixth aspect, the internal air adjustment device (30) performs the oxygen concentration reduction operation. In the oxygen concentration reduction operation, the supply air having an oxygen concentration that is lower than the oxygen concentration of the external air is separated from the external air and is supplied into the storage (1), and the discharge air having a carbon dioxide concentration that is higher than the carbon dioxide concentration of the internal air is separated from the internal air and is discharged to the outside of the storage (1). As a result, the amount of oxygen existing inside the storage (1) is reduced and the oxygen concentration of the internal air is reduced. The oxygen concentration reduction operation is performed for, for example, reducing the oxygen concentration of the internal air to a value suitable for storing plants for a long period of time.

In a seventh aspect of the present disclosure based on the sixth aspect, the internal air adjustment device includes an oxygen sensor (91) that measures the oxygen concentration of the internal air in the storage (1), and a controller (110) that determines whether or not air pressure inside the storage (1) is positive based on a change in a measured value of the oxygen sensor (91) during the oxygen concentration reduction operation, and that, when the controller (110) determines that the air pressure inside the storage (1) is not positive, performs a controlling operation for increasing a flow rate of the supply air that is supplied into the storage (1) by the first composition adjustment unit (40).

Here, when the air pressure inside the storage (1) is positive, since the external air does not move through the gap of the storage (1) and enter the inside of the storage (1), during the oxygen concentration reduction operation, the oxygen concentration of the internal air is gradually reduced. On the other hand, when the air pressure inside the storage (1) is negative, the external air moves through the gap of the storage (1) and enters the inside of the storage (1). Therefore, even during the oxygen concentration reduction operation, the oxygen concentration inside the storage (1) is only slightly reduced or the oxygen concentration inside the storage (1) is increased.

Accordingly, the controller (110) of the seventh aspect determines whether or not the air pressure inside the storage (1) is positive based on a change in the measured value of the oxygen sensor (91) during the oxygen concentration reduction operation. When the controller (110) determines that the air pressure inside the storage (1) is not positive, the first composition adjustment unit (40) controls the flow rate of the supply air that is supplied into the storage (1) so as to increase the flow rate. When the flow rate of the supply air is increased and exceeds the flow rate of the discharge air, the air pressure inside the storage (1) becomes positive.

In an eighth aspect of the present disclosure based on any one of the first aspect to the seventh aspect, the internal air adjustment device includes a ventilation exhaust passage (100) for allowing inside and the outside of the storage (1) to communicate with each other and a ventilation exhaust valve (101) that is provided in the ventilation exhaust passage (100).

In the eighth aspect, in a state in which the ventilation exhaust valve (101) is open, the inside and the outside of the storage (1) communicate with each other via the ventilation exhaust passage (100). When the ventilation exhaust valve (101) is opened with the air pressure inside the storage (1) being positive, the internal air inside the storage (1) flows to the outside of the storage (1) via the ventilation exhaust passage (100).

In a ninth aspect of the present disclosure based on any one of the first aspect to the eighth aspect, the first separation unit (41) separates untreated external air, which is external air introduced from the outside of the storage (1), into first external air and second external air having different compositions; the first composition adjustment unit (40) supplies, as the supply air, one of the first external air and the second external air into the storage (1) and discharges other of the first external air and the second external air to the outside of the storage (1); the second separation unit (61) separates untreated internal air, which is internal air introduced from inside the storage (1), into first internal air and second internal air having different compositions; and the second composition adjustment unit (60) supplies one of the first internal air and the second internal air into the storage (1) and discharges, as the discharge air, other of the first internal air and the second internal air to the outside of the storage (1).

In the ninth aspect, the first separation unit (41) separates the untreated external air into the first external air and the second external air. The first composition adjustment unit (40) supplies, as the supply air, one of the first external air and the second external air having compositions differing from each other into the storage (1) and discharges the other of the first external air and the second external air to the outside of the storage (1). The second separation unit (61) separates the untreated internal air into the first internal air and the second internal air. The second composition adjustment unit (60) supplies one of the first internal air and the second internal air having compositions differing from each other into the storage (1) and discharges, as the discharge air, the other of the first internal air and the second internal air to the outside of the storage (1).

In a tenth aspect of the present disclosure based on the ninth aspect, the first separation unit (41) is configured to separate the untreated external air into first external air having a nitrogen concentration that is higher than a nitrogen concentration of the untreated external air and an oxygen concentration that is lower than an oxygen concentration of the untreated external air and second external air having a nitrogen concentration that is lower than the nitrogen concentration of the untreated external air and an oxygen concentration that is higher than the oxygen concentration of the untreated external air; and the second separation unit (61) is configured to separate the untreated internal air into first internal air having a nitrogen concentration that is higher than a nitrogen concentration of the untreated internal air and an oxygen concentration that is lower than an oxygen concentration of the untreated internal air and second internal air having a nitrogen concentration that is lower than the nitrogen concentration of the untreated internal air and an oxygen concentration that is higher than the oxygen concentration of the untreated internal air.

In the tenth aspect, the first separation unit (41) of the first composition adjustment unit (40) separates the untreated external air, which is external air introduced from the outside of the storage (1), into the first external air having a nitrogen concentration that is higher than the nitrogen concentration of the untreated external air and an oxygen concentration that is lower than the oxygen concentration of the untreated external air and the second external air having a nitrogen concentration that is lower than the nitrogen concentration of the untreated external air and an oxygen concentration that is higher than the oxygen concentration of the untreated external air. On the other hand, the second separation unit (61) of the second composition adjustment unit (60) separates the untreated internal air, which is internal air introduced from the inside of the storage (1), into the first internal air having a nitrogen concentration that is higher than the nitrogen concentration of the untreated internal air and an oxygen concentration that is lower than the oxygen concentration of the untreated internal air and the second internal air having a nitrogen concentration that is lower than the nitrogen concentration of the untreated internal air and an oxygen concentration that is higher than the oxygen concentration of the untreated internal air.

In an eleventh aspect of the present disclosure based on the ninth aspect, the first separation unit (41) and the second separation unit (61) are each provided with a gas separation membrane (85) where a passing rate of nitrogen is less than both a passing rate of oxygen and a passing rate of carbon dioxide; the first separation unit (41) is configured to bring the untreated external air into contact with the gas separation membrane (85), cause air that did not pass through the gas separation membrane (85) to be defined as the first external air, and cause air that passed through the gas separation membrane (85) to be defined as the second external air; and the second separation unit (61) is configured to bring the untreated internal air into contact with the gas separation membrane (85), cause air that did not pass through the gas separation membrane (85) to be defined as the first internal air, and cause air that passed through the gas separation membrane (85) to be defined as the second internal air.

In the eleventh aspect, the first separation unit (41) and the second separation unit (61) are each provided with the gas separation membrane (85). In the first separation unit (41), the first external air that did not pass through the gas separation membrane (85) has a nitrogen concentration that is higher than the nitrogen concentration of the untreated external air and an oxygen concentration that is lower than the oxygen concentration of the untreated external air, and the second external air that passed through the gas separation membrane (85) has a nitrogen concentration that is lower than the nitrogen concentration of the untreated external air and an oxygen concentration that is higher than the oxygen concentration of the untreated external air. In the second separation unit (61), the first internal air that did not pass through the gas separation membrane (85) has a nitrogen concentration that is higher than the nitrogen concentration of the untreated internal air and an oxygen concentration and a carbon dioxide concentration that are lower than the oxygen concentration and the carbon dioxide concentration of the untreated internal air, and the second internal air that passed through the gas separation membrane (85) has a nitrogen concentration that is lower than the nitrogen concentration of the untreated internal air and an oxygen concentration and a carbon dioxide concentration that are higher than the oxygen concentration and the carbon dioxide concentration of the untreated internal air.

In a twelfth aspect of the present disclosure based on the eleventh aspect, the first composition adjustment unit (40) includes a first pump (36) that compresses the untreated external air and supplies the untreated external air to the first separation unit (41).

In the first composition adjustment unit (40) of the twelfth aspect, the untreated external air compressed by the first pump (36) is supplied to the first separation unit (41) and is separated into the first external air and the second external air.

In a thirteenth aspect of the present disclosure based on the twelfth aspect, the first composition adjustment unit (40) includes a first valve mechanism (46) that is provided at a pipe where the first external air flows, and that has a variable opening degree.

In the first composition adjustment unit (40) of the thirteenth aspect, the first valve mechanism (46) is provided at the pipe where the first external air flows. When the opening degree of the first valve mechanism (46) changes, the pressure of the first external air on the upstream side with respect to the first valve mechanism (46) changes. The first external air is air that did not pass through the gas separation membrane (85) of the first separation unit (41). Therefore, when the pressure of the first external air on the upstream side with respect to the first valve mechanism (46) changes, the pressure of the untreated external air that is supplied to the first separation unit (41) by the first pressure pump also changes. In general, when the pressure of air that is supplied to the gas separation membrane (85) changes, the passing rate of each component of the air changes. Therefore, when the opening degree of the first valve mechanism (46) changes, the pressure of the untreated external air that is supplied to the first separation unit (41) changes, and the composition and the flow rate of the first external air and the composition and the flow rate of the second external air (the compositions being, for example, the nitrogen concentration and the oxygen concentration) change.

In a fourteenth aspect of the present disclosure based on any one of the eleventh aspect to the thirteenth aspect, the second composition adjustment unit (60) includes a second pump (37) that compresses the untreated internal air and supplies the untreated internal air to the second separation unit (61).

In the second composition adjustment unit (60) of the fourteenth aspect, the untreated internal air compressed by the second pump (37) is supplied to the second separation unit (61) and is separated into the first internal air and the second internal air.

A fifteenth aspect of the present disclosure based on the fourteenth aspect, the second composition adjustment unit (60) includes a second valve mechanism (66) that is provided at a pipe where the first internal air flows, and that has a variable opening degree.

In the second composition adjustment unit (60) of the fifteenth aspect, the second valve mechanism (66) is provided at the pipe where the first internal air flows. When the opening degree of the second valve mechanism (66) changes, the pressure of the first internal air on the upstream side with respect to the second valve mechanism (66) changes. The first external air is air that did not pass through the gas separation membrane (85) of the second separation unit (61). Therefore, when the pressure of the first internal air on the upstream side with respect to the second valve mechanism (66) changes, the pressure of the untreated internal air that is supplied to the second separation unit (61) by the second pressure pump also changes. In general, when the pressure of air that is supplied to the gas separation membrane (85) changes, the passing rate of each component of the air changes. Therefore, when the opening degree of the second valve mechanism (66) changes, the pressure of the untreated internal air that is supplied to the second separation unit (61) changes, and the composition and the flow rate of the first internal air and the composition and the flow rate of the second internal air (the compositions being, for example, the nitrogen concentration, the oxygen concentration, and the carbon dioxide concentration) change.

In a sixteenth aspect of the present disclosure based on the ninth aspect, the first separation unit (41) includes an adsorption unit (234, 235) that is provided with an adsorbent that adsorbs nitrogen; the first separation unit (41) is configured to perform an adsorption operation of producing the first external air by causing nitrogen contained in the untreated external air supplied to the adsorption unit (234, 235) to be adsorbed onto the adsorbent of the adsorption unit (234, 235), and a desorption operation of producing the second external air by causing nitrogen to be desorbed from the adsorbent of the adsorption unit (234, 235); the second separation unit (61) is provided with a gas separation membrane (85) where a passing rate of nitrogen is lower than both a passing rate of oxygen and a passing rate of carbon dioxide; and the second separation unit (61) is configured to bring the untreated internal air into contact with the gas separation membrane (85), cause air that did not pass through the gas separation membrane (85) to be defined as the first internal air, and cause air that passed through the gas separation membrane (85) to be defined as the second external air.

In the sixteenth aspect, the first separation unit (41) is provided with the adsorption unit (234, 235). The first separation unit (41) of this aspect performs the adsorption operation and the desorption operation. In the adsorption operation, the untreated external air supplied to the adsorption unit (234, 235) has its nitrogen taken away by the adsorbent and becomes the second external air. The nitrogen concentration of the second external air is lower than the nitrogen concentration of the untreated external air and the oxygen concentration of the second external air is higher than the oxygen concentration of the untreated external air. On the other hand, in the desorption operation, in the adsorption unit (234, 235), nitrogen adsorbed by the adsorbent during the adsorption operation is desorbed from the adsorbent. As a result, the adsorption unit (234, 235) produces the first external air having a nitrogen concentration that is higher than the nitrogen concentration of the untreated external air and an oxygen concentration that is lower than the oxygen concentration of the untreated external air.

In the sixteenth aspect, the second separation unit (61) is provided with the gas separation membrane (85). In the second separation unit (61), the first internal air that did not pass through the gas separation membrane (85) has a nitrogen concentration that is higher than the nitrogen concentration of the untreated internal air and an oxygen concentration and a carbon dioxide concentration that are lower than the oxygen concentration and the carbon dioxide concentration of the untreated internal air, and the second internal air that passed through the gas separation membrane (85) has a nitrogen concentration that is lower than the nitrogen concentration of the untreated internal air and an oxygen concentration and a carbon dioxide concentration that are higher than the oxygen concentration and the carbon dioxide concentration of the untreated internal air.

In a seventeenth aspect of the present disclosure based on any one of the first aspect to the sixteenth aspect, the first composition adjustment unit (40) includes a first bypass passage (51, 255) for supplying the external air existing outside the storage (1) into the storage (1) by causing the external air to bypass the first separation unit (41), and a first bypass valve mechanism (50, 256) for changing a flow rate of the external air that flows into the first bypass passage (51, 255).

In the seventeenth aspect, when the first bypass valve mechanism (50, 256) is operated and the external air is in a state in which it flows through the first bypass passage (51, 255), a portion of or the entire external air that has flowed into the first composition adjustment unit (40) from the outside of the storage (1) is supplied into the storage (1) as it is (that is, in a state in which the composition is maintained).

In an eighteenth aspect of the present disclosure based on any one of the first aspect to the seventeenth aspect, the second composition adjustment unit (60) includes a second bypass passage (71) for supplying the internal air existing inside the storage (1) into the storage (1) by causing the internal air to bypass the second separation unit (61), and a second bypass valve mechanism (70) for changing a flow rate of the internal air that flows into the second bypass passage (71).

In the eighteenth aspect, when the second bypass valve mechanism (70) is operated and the internal air is in a state in which it flows through the second bypass passage (71), a portion of or the entire internal air that has flowed to the second composition adjustment unit (60) from the inside of the storage (1) is supplied into the storage (1) as it is (that is, in a state in which the composition is maintained).

Advantageous Effects of Invention

In the internal air adjustment device (30) of the first aspect, the first composition adjustment unit (40) supplies the supply air having a composition that differs from the composition of the external air into the storage (1) and the second composition adjustment unit (60) discharges the discharge air having a composition that differs from the composition of the internal air to the outside of the storage (1). The internal air adjustment device (30) of the present aspect "supplies the supply air to the storage (1)" and "discharges the discharge air from the storage (1)" to adjust the composition of the air inside the storage (1). Therefore, according to the present aspect, compared to when the internal air adjustment device only "discharges the discharge air from the storage (1)", it is possible to properly control the composition of the internal air inside the storage (1).

In the third aspect, the first composition adjustment unit (40) supplies air into the storage (1) from the outside of the storage (1) so that the air pressure inside the storage (1) becomes positive. Therefore, even in a state in which, for adjusting the composition of the air inside the storage (1), the second composition adjustment unit (60) discharges the discharge air separated from the internal air to the outside of the storage (1), it is possible to cause the air pressure inside the storage (1) to be positive. Therefore, according to this aspect, even if the airtightness of the storage (1) is low, it is possible to suppress entry of the external air from the gap of the storage (1) and to properly control the composition of the air inside the storage (1).

In the fourth aspect, the flow rate of the supply air that is supplied into the storage (1) by the first composition adjustment unit (40) exceeds the flow rate of the discharge air that is discharged to the outside of the storage (1) by the second composition adjustment unit (60). Therefore, it is possible to cause the air pressure inside the storage (1) to be positive.

In the fifth aspect, the internal air adjustment device (30) performs the carbon dioxide concentration reduction operation to make it possible to control the carbon dioxide concentration of the internal air.

In the sixth aspect, the internal air adjustment device (30) performs the oxygen concentration reduction operation to make it possible to control the oxygen concentration of the internal air.

In the seventh aspect, when the controller (110) determines that the air pressure inside the storage (1) is not positive, the controller (110) controls the flow rate of the supply air that is supplied into the storage (1) by the first composition adjustment unit (40) so as to be increased. Therefore, according to this aspect, it is possible to more reliably cause the air pressure inside the storage (1) to be positive.

In the tenth aspect, the first composition adjustment unit (40) supplies one of the first external air and the second external air, each having a nitrogen concentration and an oxygen concentration differing from the nitrogen concentration and the oxygen concentration of the untreated external air, into the storage and discharges the other of the first external air and the second external air to the outside of the storage. The second composition adjustment unit (60) supplies one of the first internal air and the second internal air, each having a nitrogen concentration and an oxygen concentration differing from the nitrogen concentration and the oxygen concentration of the untreated internal air, into the storage and discharges the other of the first internal air and the second internal air to the outside of the storage. Therefore, according to this aspect, it is possible to adjust the nitrogen concentration and the oxygen concentration of the internal air in the storage (1).

In the eleventh aspect, the first composition adjustment unit (40) supplies one of the first external air and the second external air, each having a nitrogen concentration and an oxygen concentration differing from the nitrogen concentration and the oxygen concentration of the untreated external air, into the storage and discharges the other of the first external air and the second external air to the outside of the storage. The second composition adjustment unit (60) supplies one of the first internal air and the second internal air, each having a nitrogen concentration, an oxygen concentration, and a carbon dioxide concentration differing from the nitrogen concentration, the oxygen concentration, and the carbon dioxide concentration of the untreated internal air, into the storage and discharges the other of the first internal air and the second internal air to the outside of the storage. Therefore, according to this aspect, it is possible to adjust the nitrogen concentration, the oxygen concentration, and the carbon dioxide concentration of the internal air in the storage (1).

In the thirteenth aspect, the first pump (36) sends the untreated external air compressed thereby to the first separation unit (41), and the opening degree of the first valve mechanism (46) is adjusted to make it is possible to control the composition and the flow rate of the first external air and the composition and the flow rate of the second external air (the compositions being, for example, the nitrogen concentration and the oxygen concentration). Therefore, according to this aspect, the first composition adjustment unit (40) adjusts the composition and the flow rate of air that is supplied into the storage (1) to make it possible to more properly control the composition of the air inside the storage (1).

In the fifteenth aspect, the second pump (37) sends the untreated internal air compressed thereby to the second separation unit (61), and the opening degree of the second valve mechanism (66) is adjusted to make it is possible to control the composition and the flow rate of the first internal air and the composition and the flow rate of the second internal air (the compositions being, for example, the nitrogen concentration, the oxygen concentration, and the carbon dioxide concentration). Therefore, according to this aspect, the second composition adjustment unit (60) adjusts the composition and the flow rate of air that is supplied into the storage (1) to make it possible to more properly control the composition of the air inside the storage (1).

In the sixteenth aspect, the first composition adjustment unit (40) supplies one of the first external air and the second external air, each having a nitrogen concentration and an oxygen concentration differing from the nitrogen concentration and the oxygen concentration of the untreated external air, into the storage and discharges the other of the first external air and the second external air to the outside of the storage. The second composition adjustment unit (60) supplies one of the first internal air and the second internal air, each having a nitrogen concentration, an oxygen concentration, and a carbon dioxide concentration differing from the nitrogen concentration, the oxygen concentration, and the carbon dioxide concentration of the untreated internal air, into the storage and discharges the other of the first internal air and the second internal air to the outside of the storage. Therefore, according to this aspect, it is possible to adjust the nitrogen concentration, the oxygen concentration, and the carbon dioxide concentration of the internal air in the storage (1).

DESCRIPTION OF EMBODIMENTS

Embodiments of the present invention are described in detail based on the drawings.

First Embodiment

A first embodiment is described. In order to perform a so-called CA (controlled atmosphere) transport, an internal air adjustment device (30) of the present embodiment is provided in a transport container (1). The internal air adjustment device (30) adjusts the composition of air inside the transport container (1) so as to differ from the composition of the atmosphere.

Figure 1:
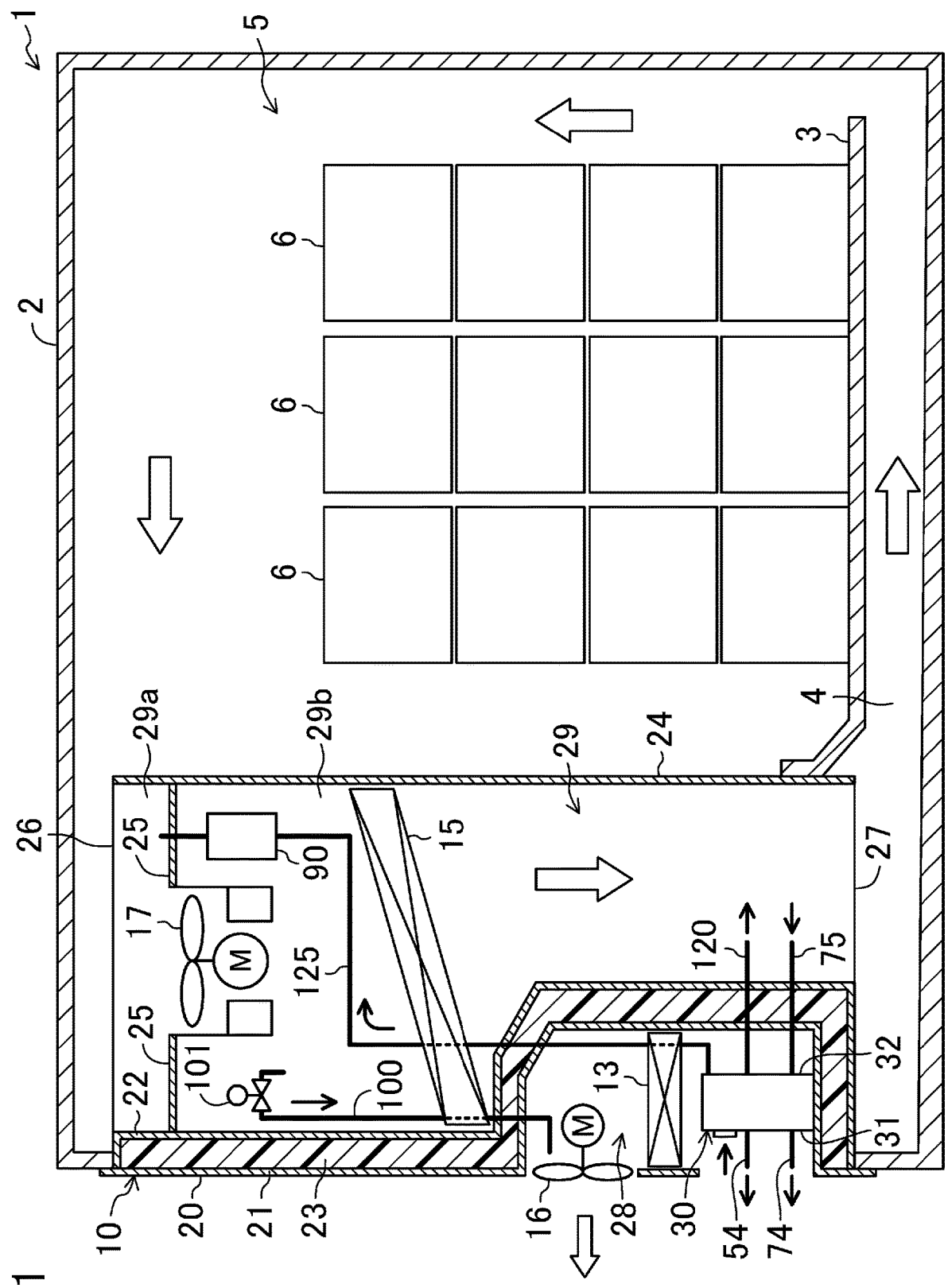
FIG. 1 is a schematic sectional view of a transport container including an internal air adjustment device of a first embodiment.

As shown in FIG. 1, the transport container (1) that constitutes the storage includes a container main body (2) and a container refrigerator (10). The transport container (1) is a reefer container whose temperature therein is controllable. The internal air adjustment device (30) of the present embodiment is installed in the container refrigerator (10). The transport container (1) is used to transport plants that take in oxygen ($O_2$) in the air and release carbon dioxide ($CO_2$). Examples of plants include fruits, such as bananas and avocados, vegetables, cereals, bulbs, and natural flowers.

The container main body (2) has an elongated rectangular parallelepiped box shape. The container main body (2) has an opening in one end, and the container refrigerator 10 is mounted so as to cover the opening end. An internal space of the container main body (2) constitutes a load room (5) for accommodating goods (6).

A floor plate (3) for placing the goods (6) thereon is disposed in a bottom portion of the load room (5). An underfloor flow path (4) for allowing air blown out by the container refrigerator (10) to flow therein is formed between the floor plate (3) and a bottom plate of the container main body (2). The underfloor flow path (4) is a flow path extending in a longitudinal direction of the container main body (2) along the bottom plate of the container main body (2). One end of the underfloor flow path (4) is connected to a blow-out port (27) of the container refrigerator (10) and the other end communicates with a space above the floor plate (3) (that is, a space where the goods (6) are accommodated).

-Container Refrigerator-

As shown in FIG. 1, the container refrigerator (10) includes a casing (20), a refrigerant circuit (11) that performs a refrigeration cycle, an external fan (16), and an internal fan (17).

The casing (20) includes an external wall portion (21), an internal wall portion (22), a rear plate (24), and a partition plate (25). As described below, the casing (20) is provided with the refrigerant circuit (11), the external fan (16), and the internal fan (17).

The external wall portion (21) is a plate member that is disposed so as to cover the opening end of the container main body (2). A lower portion of the external wall portion (21) bulges toward an inner side of the container main body (2). The internal wall portion (22) is a plate member extending along the external wall portion (21). The internal wall portion (22) is disposed so as to cover a surface of the external wall portion (21) on an inner side of the container main body (2). A heat insulating material (23) fills a space between the external wall portion (21) and the internal wall portion (22).

A lower portion of the casing (20) is recessed toward the inner side of the container main body (2). An external machine room (28) that communicates with the outside space of the transport container (1) is formed at the lower portion of the casing (20). The external fan (16) is disposed in the external machine room (28).

The rear plate (24) is a substantially rectangular plate member. The rear plate (24) is disposed more toward the inner side of the container main body (2) than the internal wall portion (22), and an internal air flow path (29) is formed between the internal wall portion (22) and the rear plate (24). An upper end of the internal air flow path (29) defines an intake port (26) of the casing (20), and a lower end of the internal air flow path (29) defines the blow-out port (27) of the casing (20).

The partition plate (25) is a plate member disposed so as to divide the internal air flow path (29) in an up-and-down direction. The partition plate (25) is disposed in an upper portion of the internal air flow path (29). The partition plate (25) divides the internal air flow path (29) into a primary flow path (29a) above the partition plate (25) and a secondary flow path (29b) below the partition plate (25). The primary flow path (29a) communicates with the load room (5) via the intake port (26). The secondary flow path (29b) communicates with the underfloor flow path (4) via the blow-out port (27). The internal fan (17) is mounted on the partition plate (25). The internal fan (17) is disposed so that air sucked in from the primary flow path 29a is blown out toward the secondary flow path (29b).

Figure 2:
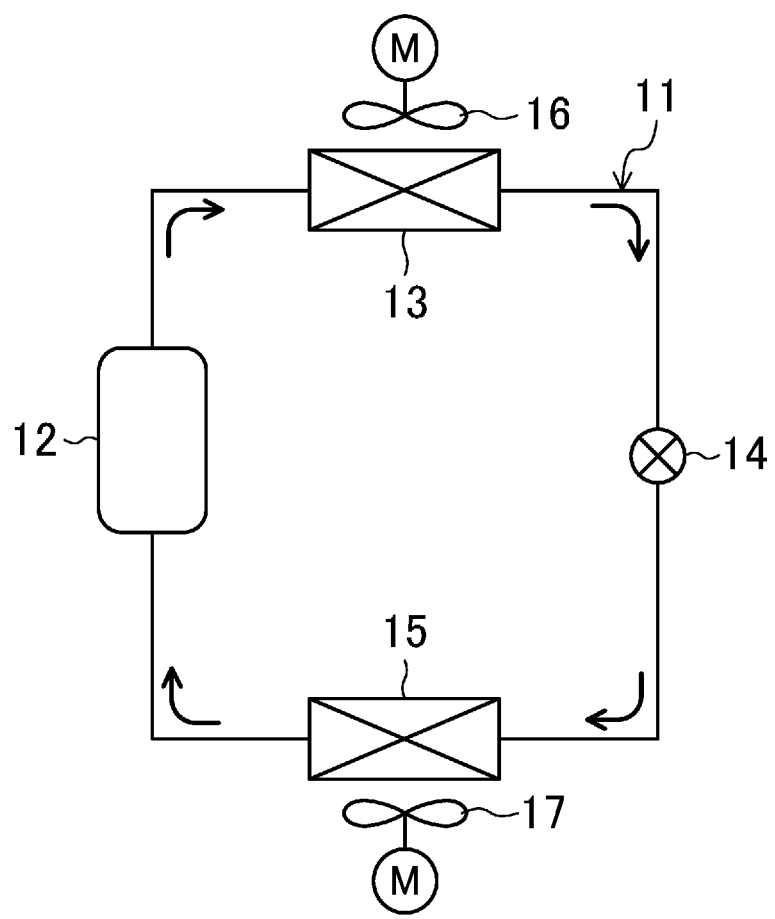
FIG. 2 is a refrigerant circuit diagram showing a structure of a refrigerant circuit of a container refrigerator provided in the transport container.

As shown in FIG. 2, the refrigerant circuit (11) is a closed circuit formed by connecting a compressor (12), a condenser (13), an expansion valve (14), and an evaporator (15) to each other by a pipe. When the compressor (12) is operated, a refrigerant circulates in the refrigerant circuit (11) and a vapor compression refrigeration cycle is performed. As shown in FIG. 1, the condenser (13) is disposed on an intake side of the external fan (16) in the external machine room (28), and the evaporator (15) is disposed in the secondary flow path (29b) of the internal air flow path (29). Although not shown in FIG. 1, the compressor (12) is disposed in the external machine room (28).

-Internal Air Adjustment Device-

As shown in FIG. 1, the internal air adjustment device (30) includes a main body unit (31), a sensor unit (90), a ventilation exhaust pipe (100), and a controller (110). The main body unit (31) is installed in the external machine room (28) of the container refrigerator (10). The sensor unit (90) is installed in the internal air flow path (29) of the transport container (1). The ventilation exhaust pipe (100) is installed from the internal air flow path (29) to the external machine room (28) of the transport container (1). The controller (110) is provided in the main body unit (31) and controls structural equipment of the internal air adjustment device (30). The sensor unit (90), the ventilation exhaust pipe (100), and the controller (110) are described in detail below.

Figure 3:
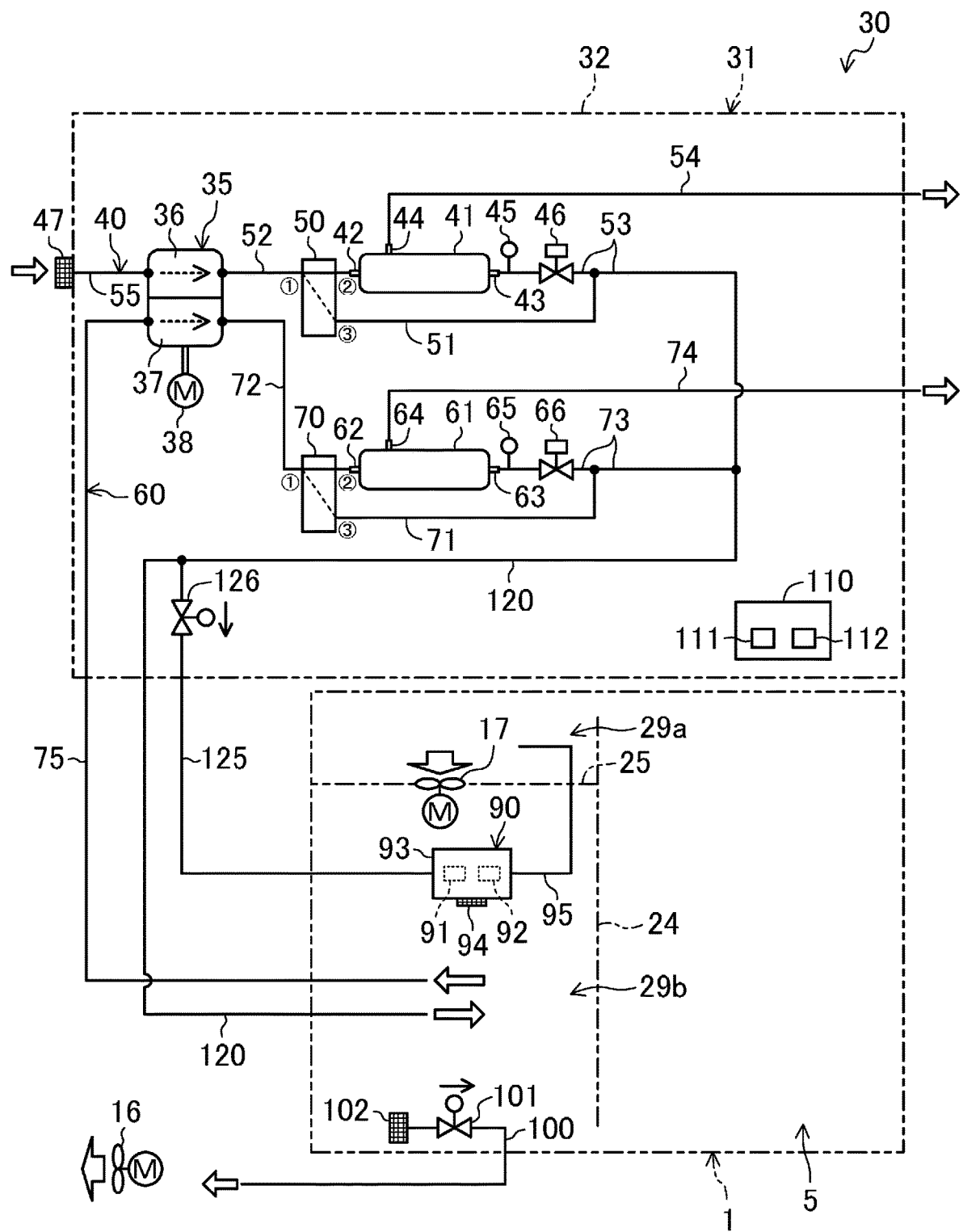
FIG. 3 is a pipe system diagram showing a structure of the internal air adjustment device of the first embodiment.

As shown in FIG. 3, the main body unit (31) of the internal air adjustment device (30) includes a first composition adjustment unit (40), a second composition adjustment unit (60), a pump unit (35), and a unit case (32). The unit case (32) is a hermetically sealed box-shaped container. The first composition adjustment unit (40), the second composition adjustment unit (60), and the pump unit (35) are disposed in an internal space of the unit case (32). The first composition adjustment unit (40), the second composition adjustment unit (60), and the pump unit (35) are described in detail below.

The internal air adjustment device (30) includes a supply pipe (120), an internal-side suction pipe (75), and a measurement pipe (125). The supply pipe (120), the internal-side suction pipe (75), and the measurement pipe (125) are pipes for connecting the main body unit (31) to the internal air flow path (29) of the container refrigerator (10).

The supply pipe (120) is a pipe for supplying air that has flowed out from the first composition adjustment unit (40) and the second composition adjustment unit (60) to the load room (5). An inlet end of the supply pipe (120) is connected to the first composition adjustment unit (40) and the second composition adjustment unit (60), and an outlet end of the supply pipe (120) opens into the secondary flow path (29*b*) of the internal air flow path (29).

The internal-side suction pipe (75) is a pipe for supplying internal air inside the load room (5) into the second composition adjustment unit (60). An inlet end of the internal-side suction pipe (75) opens into the secondary flow path (29*b*) of the internal air flow path (29), and an outlet end of the internal-side suction pipe (75) is connected to a second pump (37) of the second composition adjustment unit (60) described later. In the secondary flow path (29*b*) of the internal air flow path (29), the inlet end of the internal-side suction pipe (75) is disposed on an upstream side of the outlet end of the supply pipe (120).

The measurement pipe (125) is a pipe for supplying air that flows through the supply pipe (120) into the sensor unit (90). An inlet end of the measurement pipe (125) is connected to the supply pipe (120) and an outlet end of the measurement pipe (125) is connected to the sensor unit (90). A measurement on-off valve (126), constituted by an electromagnetic valve, is provided at the measurement pipe (125). The measurement on-off valve (126) is accommodated in the unit case (32) of the main body unit (31).

The ventilation exhaust pipe (100), the supply pipe (120), the internal-side suction pipe (75), the measurement pipe (125), and pipes (52 to 55, 71 to 74, 95) that are provided in a corresponding one of the composition adjustment units (40, 60) described below may be constituted by hard pipes or soft hoses, or may be constituted by a combination of a pipe and a hose.

<Pump Unit>

As shown in FIG. 3, the pump unit (35) includes a first pump (36), the second pump (37), and a driving motor (38).

The first pump (36) and the second pump (37) are each an air pump that discharges sucked-in air. The first pump (36) and the second pump (37) are each constituted by, for example, a displacement fluid machine. The first pump (36) and the second pump (37) are integrated with each other. The driving motor (38) is an electric motor connected to the first pump (36) and the second pump (37). The driving motor (38) drives both the first pump (36) and the second pump (37).

<First Composition Adjustment Unit>

The first composition adjustment unit (40) is configured to separate external air sucked in from the outside of the transport container (1) (untreated external air) into first external air and second external air. The first composition adjustment unit (40) of the present embodiment supplies the first external air, which is supply air, into the load room (5) and discharges the second external air to the outside of the transport container (1).

The first composition adjustment unit (40) includes an air filter (47), a first separation module (41), a first bypass valve (50), a first pressure sensor (45), and a first adjustment valve (46). The first composition adjustment unit (40) also includes an external-side suction pipe (55), a first introducing pipe (52), a first primary-side pipe (53), a first secondary-side pipe (54), and a first bypass pipe (51). The first pump (36) of the pump unit (35) constitutes the first composition adjustment unit (40).

The air filter (47) is a membrane filter for trapping, for example, dust or salt contained in the external air. The air filter (47) is mounted on the unit case (32) of the main body unit (31). The air filter (47) is connected to a suction port of the first pump 36 via the external-side suction pipe (55). In the internal air adjustment device (30) of the present embodiment, the air filter (47) and the first pump (36) may communicate with each other via the internal space of the unit case (32), which is a hermetically sealed container, without providing the external-side suction pipe (55).

Although described in detail below, the first separation module (41) has a first introducing port (42), a first primary-side guide-out port (43), and a first secondary-side guide-out port (44). The first introducing port (42) is connected to a discharge port of the first pump (36) via the first introducing pipe (52). The first primary-side guide-out port (43) is connected to the supply pipe (120) via the first primary-side pipe (53). One end of the first secondary-side pipe (54) is connected to the first secondary-side guide-out port (44). The first secondary-side pipe (54) extends to the outside of the unit case (32). The other end of the first secondary-side pipe (54) opens to the intake side of the external fan (16) in the external machine room (28).

The first bypass valve (50) is a switching valve having three ports and constitutes a first bypass valve mechanism. The first bypass valve (50) is configured to be switched between a first state in which a first port communicates with a second port and is blocked from a third port (a state shown by a solid line in FIG. 3) and a second state in which the first port communicates with the third port and is blocked from the second port (a state shown by a broken line in FIG. 3).

The first bypass valve (50) is disposed at the first introducing pipe (52). In the first bypass valve (50), the first port is connected to the discharge port of the first pump (36), and the second port is connected to the first introducing port (42) of the first separation module (41). An inlet end of the first bypass pipe (51) is connected to the third port of the first bypass valve (50). An outlet end of the first bypass pipe (51) is connected to the first primary-side pipe (53). The first bypass pipe (51) constitutes a first bypass passage.

The first pressure sensor (45) and the first adjustment valve (46) are provided at the first primary-side pipe (53). The first pressure sensor (45) and the first adjustment valve (46) are disposed closer than the other end of the first bypass pipe (51) that is connected to the first primary-side pipe (53) to the first separation module (41). The first pressure sensor (45) is disposed closer than the first adjustment valve (46) to the first separation module (41).

The first pressure sensor (45) measures the pressure of the first external air that has flowed out from the first primary-side guide-out port (43) of the first separation module (41). The measured value of the first pressure sensor (45) is substantially equal to the pressure of untreated external air that the first pump (36) supplies into the first separation module (41).

The first adjustment valve (46) is an electric valve whose opening degree is changeable and constitutes a first valve mechanism. When the opening degree of the first adjustment valve (46) changes, the pressure of the untreated external air that the first pump (36) supplies into the first separation module (41) changes.

The first separation module (41) constitutes a first separation unit. Although described in detail below, the first separation module (41) includes gas separation membranes (85). The first separation module (41) separates untreated external air into first external air that did not pass through the gas separation membranes (85) and second external air that passed through the gas separation membranes (85).

The first external air has a nitrogen concentration that is higher than that of the untreated external air and an oxygen concentration that is lower than that of the untreated external air. The second external air has a nitrogen concentration that is lower than that of the untreated external air and an oxygen concentration that is higher than that of the untreated external air. In this way, the concentrations of the substances that make up the first external air and the concentrations of the substances that make up the second external air differ from each other. Concentration in the present description means volume ratio.

<Second Composition Adjustment Unit>

The second composition adjustment unit (60) is configured to separate internal air sucked in from the internal space of the transport container (1) (untreated internal air) into first internal air and second internal air. The second composition adjustment unit (60) of the present embodiment supplies the first internal air into the load room (5) and discharges the second internal air, which is discharge air, to the outside of the transport container (1).

The second composition adjustment unit (60) includes a second separation module (61), a second bypass valve (70), a second pressure sensor (65), and a second adjustment valve (66). The second composition adjustment unit (60) also includes a second introducing pipe (72), a second primary-side pipe (73), a second secondary-side pipe (74), and a second bypass pipe (71). The second pump (37) of the pump unit (35) constitutes the second composition adjustment unit (60).

Although described in detail below, the second separation module (61) has a second introducing port (62), a second primary-side guide-out port (63), and a second secondary-side guide-out port (64). The second introducing port (62) is connected to a discharge port of the second pump (37) via the second introducing pipe (72). The second primary-side guide-out port (63) is connected to the supply pipe (120) via the second primary-side pipe (73). One end of the second secondary-side pipe (74) is connected to the second secondary-side guide-out port (64). The second secondary-side pipe (74) extends to the outside of the unit case (32). The other end of the second secondary-side pipe (74) opens to the intake side of the external fan (16) in the external machine room (28). The internal-side suction pipe (75) is connected to a suction port of the second pump (37).

The second bypass valve (70) is a switching valve having three ports and constitutes a second bypass valve mechanism. The second bypass valve (70) is configured to be switched between a first state in which a first port communicates with a second port and is blocked from a third port (a state shown by a solid line in FIG. 3) and a second state in which the first port communicates with the third port and is blocked from the second port (a state shown by a broken line in FIG. 3).

The second bypass valve (70) is disposed at the second introducing pipe (72). In the second bypass valve (70), the first port is connected to the discharge port of the second pump (37), and the second port is connected to the second introducing port (62) of the second separation module (61). An inlet end of the second bypass pipe (71) is connected to the third port of the second bypass valve (70). An outlet end of the second bypass pipe (71) is connected to the second primary-side pipe (73). The second bypass pipe (71) constitutes a second bypass passage.

The second pressure sensor (65) and the second adjustment valve (66) are provided at the second primary-side pipe (73). The second pressure sensor (65) and the second adjustment valve (66) are disposed closer than the other end of the second bypass pipe (71) that is connected to the second primary-side pipe (73) to the second separation module (61). The second pressure sensor (65) is disposed closer than the second adjustment valve (66) to the second separation module (61).

The second pressure sensor (65) measures the pressure of the second external air that has flowed out from the second primary-side guide-out port (63) of the second separation module (61). The measured value of the second pressure sensor (65) is substantially equal to the pressure of untreated internal air that the second pump (37) supplies into the second separation module (61).

The second adjustment valve (66) is an electric valve whose opening degree is changeable and constitutes a second valve mechanism. When the opening degree of the second adjustment valve (66) changes, the pressure of the untreated internal air that the second pump (37) supplies into the second separation module (61) changes.

The second separation module (61) constitutes a second separation unit. Although described in detail below, the second separation module (61) includes gas separation membranes (85). The second separation module (61) separates untreated internal air into first internal air that did not pass through the gas separation membranes (85) and second internal air that passed through the gas separation membranes (85).

The first internal air has a nitrogen concentration that is higher than that of the untreated internal air and an oxygen concentration and a carbon dioxide concentration that are lower than those of the untreated internal air. The second internal air has a nitrogen concentration that is lower than that of the untreated internal air and an oxygen concentration and a carbon dioxide concentration that are higher than those of the untreated internal air. In this way, the concentrations of the substances that make up the first internal air and the concentrations of the substances that make up the second internal air differ from each other.

<Separation Modules>

Figure 4:
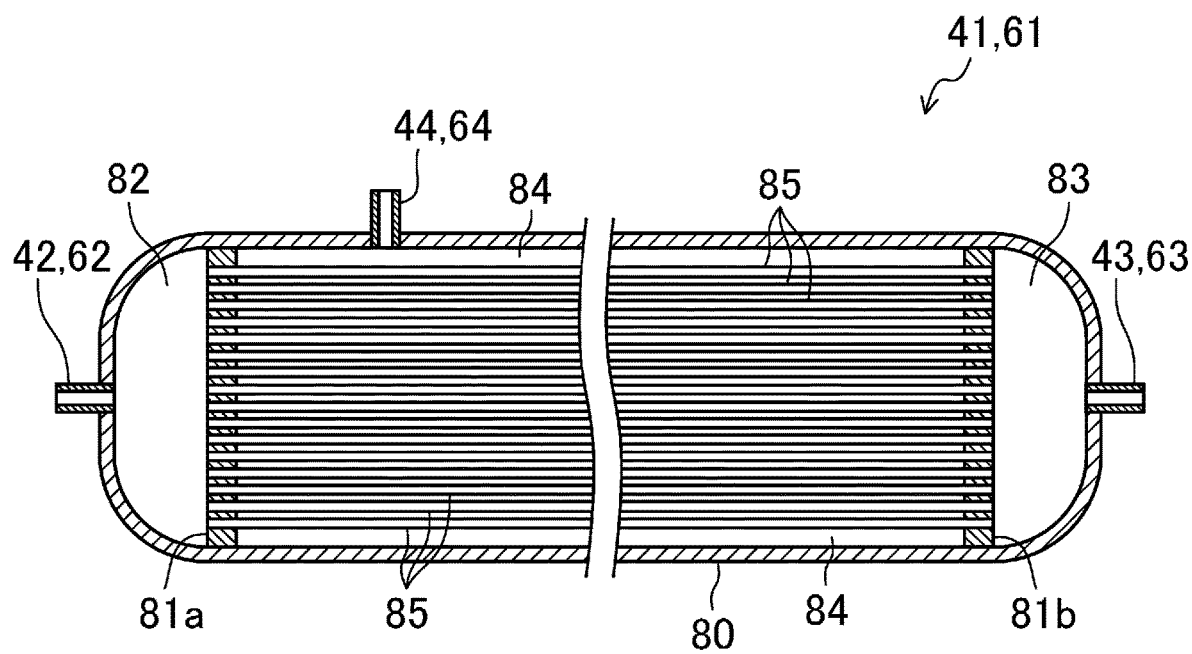
FIG. 4 is a schematic sectional view of a separation module provided in the internal air adjustment device of the first embodiment.

Structures of the first separation module (41) and the second separation module (61) are described with reference to FIG. 4. The structure of the first separation module (41) and the structure of the second separation module (61) are the same.

Each separation module (41, 61) includes one cylindrical case (80) and two partition walls (81*a*, 81*b*). Each cylindrical case (80) is an elongated cylindrical container having both ends closed. Each partition wall (81*a*, 81*b*) is a member for dividing an internal space of the corresponding cylindrical case (80) and is provided so as to traverse the internal space of the corresponding cylindrical case (80). The partition walls (81a, 81b) are disposed so that one of the partition walls is disposed closer to one end of the internal space of the cylindrical case (80) and the other of the partition walls is disposed closer to the other end of the internal space of the cylindrical case (80). In FIG. 4, the internal space of each cylindrical case (80) is divided into an introducing room (82) that is positioned on the left of the left partition wall (81a), a secondary-side guide-out room (84) that is positioned between the two partition walls (81a, 81b), and a primary-side guide-out room (83) that is positioned on the right of the right partition wall (81b).

Each separation module (41, 61) includes the plurality of gas separation membranes (85) having hollow fiber-like shapes (that is, very thin tubular shapes having an outside diameter less than or equal to 1 mm). Each hollow fiber-like gas separation membrane (85) is provided from the one partition wall (81a) to the other partition wall (81b). One end portion of each gas separation membrane (85) extends through the one partition wall (81a) and opens into the corresponding introducing room (82) and the other end portion of each gas separation membrane (85) extends through the other partition wall (81b) and opens into the corresponding primary-side guide-out room (83). In the internal space of each cylindrical case (80), a portion of a space interposed between the two partition walls (81a, 81b) on an outer side with respect to the gas separation membranes (85) constitutes the secondary-side guide-out room (84). In each separation module (41, 61), the introducing room (82) and the primary-side guide-out room (83) communicate with each other via the hollow fiber-like gas separation membranes (85), whereas the secondary-side guide-out room (84) does not communicate with a space on an inner side of each gas separation membrane (85), the introducing room (82), and the primary-side guide-out room (83).

Each cylindrical case (80) has the introducing port (42, 62), the primary-side guide-out port (43, 63), and the secondary-side guide-out port (44, 64). Each introducing port (42, 62) is disposed in a left end portion of the corresponding cylindrical case (80) in FIG. 4, and communicates with the corresponding introducing room (82). Each primary-side guide-out port (43, 63) is disposed in a right end portion of the corresponding cylindrical case (80) in FIG. 4, and communicates with the corresponding primary-side guide-out room (83). Each secondary-side guide-out port (44, 64) is disposed in an intermediate portion of the corresponding cylindrical case (80) in a longitudinal direction, and communicates with the corresponding secondary-side guide-out room (84).

Each gas separation membrane (85) is a non-porous polymer membrane. Each gas separation membrane (85) separates components contained in mixture gas by making use of the fact that the speeds at which molecules pass through the gas separation membranes (85) (passing speeds) depend upon substances.

In the internal air adjustment device (30) of the present embodiment, the same gas separation membranes (85) are provided in each of the first separation module (41) and the second separation module (61). The gas separation membranes (85) of each separation module (41, 61) have the property that the passing speed of nitrogen is lower than both the passing speed of oxygen and the passing speed of carbon dioxide. The plurality of hollow fiber-like gas separation membranes (85) have substantially the same membrane thickness. Therefore, the gas separation membranes (85) that are provided in each separation module (41, 61) have the property that the passing rate of nitrogen is lower than both the passing rate of oxygen and the passing rate of carbon dioxide.

In each separation module (41, 61), air that has flowed into the introducing room (82) via the introducing port (42, 62) flows in the space on the inner side of each hollow fiber-like gas separation membrane (85) toward the primary-side guide-out room (83). A portion of the air that flows in the space on the inner side of each gas separation membrane (85) passes through the gas separation membranes (85) and moves toward the secondary-side guide-out room (84), and a remaining portion thereof flows into the primary-side guide-out room (83).

The gas separation membranes (85) of each separation module (41, 61) have a nitrogen passing rate that is lower than the oxygen passing rate and the carbon dioxide passing rate. That is, nitrogen is less likely to pass through the gas separation membranes (85) than oxygen and carbon dioxide. Therefore, air that flows on the inner side of each hollow fiber-like gas separation membrane (85) is such that, with decreasing distance from each primary-side guide-out room (83), at the same time that the nitrogen concentration increases, the oxygen concentration and the carbon dioxide concentration decrease. The oxygen and carbon dioxide contained in the air that flows in the hollow fiber-like gas separation membranes (85) pass through the gas separation membranes (85) and move toward the corresponding secondary-side guide-out rooms (84).

As a result, air that has flowed into each primary-side guide-out room (83) without passing through the gas separation membranes (85) has a nitrogen concentration that is higher than that of air in the corresponding introducing room (82) and has an oxygen concentration and a carbon dioxide concentration that are lower than those of the air in the corresponding introducing room (82). Air that has passed through the gas separation membranes (85) and moved to the corresponding secondary-side guide-out room (84) has a nitrogen concentration that is lower than that of air in the corresponding introducing room (82) and has an oxygen concentration and a carbon dioxide concentration that are higher than those of the air in the corresponding introducing room (82).

In the first separation module (41), untreated external air flows into the introducing room (82) from the first introducing port (42), air that has flowed into the primary-side guide-out room (83) without passing through the gas separation membranes (85) flows out from the first primary-side guide-out port (43) as first external air, and air that has passed through the gas separation membranes (85) and flowed into the secondary-side guide-out room (84) flows out from the first secondary-side guide-out port (44) as second external air. On the other hand, in the second separation module (61), untreated internal air flows into the introducing room (82) from the second introducing port (62), air that has flowed into the primary-side guide-out room (83) without passing through the gas separation membranes (85) flows out from the second primary-side guide-out port (63) as first internal air, and air that has passed through the gas separation membranes (85) and flowed into the secondary-side guide-out room (84) flows out from the second secondary-side guide-out port (64) as second internal air.

<Sensor Unit>

As shown in FIGS. 1 and 3, the sensor unit (90) is disposed in the secondary flow path (29b) of the internal air flow path (29) of the container refrigerator (10). As shown in FIG. 3, the sensor unit (90) includes an oxygen sensor (91), a carbon dioxide sensor (92), and a sensor case (93).

The oxygen sensor (91) is a zirconia current sensor that measures the oxygen concentration of mixture gas, such as air. The carbon dioxide sensor (92) is a nondispersive infrared (NDIR) sensor that measures the carbon dioxide concentration of mixture gas, such as air. The oxygen sensor (91) and the carbon dioxide sensor (92) are accommodated in the sensor case (93).

The sensor case (93) is a slightly elongated box-shaped member. The outlet end of the measurement pipe (125) is connected to one end portion of the sensor case (93) in a longitudinal direction, and one end of the outlet pipe (95) is connected to the other end portion of the sensor case (93). The other end of the outlet pipe (95) opens into the primary flow path (29a) of the internal air flow path (29). An air filter (94) for allowing the internal air that flows through the internal air flow path (29) to be introduced into an internal space of the sensor case (93) is mounted on the sensor case (93). The air filter (94) is a membrane filter for trapping, for example, dust that is contained in the internal air.

As described below, when the internal fan (17) is operating, the air pressure in the secondary flow path (29b) becomes slightly higher than the air pressure in the primary flow path (29a). Therefore, in a state in which the measurement on-off valve (126) is closed, internal air in the secondary flow path (29b) flows into the sensor case (93) via the air filter (94) and, then, passes through the outlet pipe (95) and flows into the primary flow path (29a). In this state, in the sensor unit (90), the oxygen sensor (91) measures the oxygen concentration of the internal air, and the carbon dioxide sensor (92) measures the carbon dioxide concentration of the internal air.

<Ventilation Exhaust Pipe>

The ventilation exhaust pipe (100) is a pipe for connecting the inside and the outside of the transport container (1). The ventilation exhaust pipe (100) constitutes a ventilation exhaust passage. As shown in FIG. 1, the ventilation exhaust pipe (100) extends through the casing (20) of the container refrigerator (10). One end of the ventilation exhaust pipe (100) opens into the secondary flow path (29b) of the internal air flow path (29). The other end of the ventilation exhaust pipe (100) opens to a suction side of the external fan (16) in the external machine room (28).

As shown in FIG. 3, an air filter (102) is mounted on one end of the ventilation exhaust pipe (100). The air filter (102) is a membrane filter for trapping, for example, dust that is contained in the internal air. A ventilation exhaust valve (101) is provided at the ventilation exhaust pipe (100). The ventilation exhaust valve (101) is an on-off valve that is constituted by an electromagnetic valve.

<Controller>

The controller (110) includes a CPU (111) that performs a controlling operation and a memory (112) that stores, for example, data required for the controlling operation. Measured values of the oxygen sensor (91), the carbon dioxide sensor (92), the first pressure sensor (45), and the second pressure sensor (65) are input to the controller (110). The controller (110) performs a controlling operation for operating the pump unit (35), the first adjustment valve (46), the second adjustment valve (66), the first bypass valve (50), the second bypass valve (70), and the ventilation exhaust valve (101).

-Operation of Container Refrigerator-

The container refrigerator (10) operates to cool internal air in the transport container (1).

In the cooling operation, the compressor (12) of the refrigerant circuit (11) operates and a refrigerant circulates in the refrigerant circuit (11) to perform a vapor compression refrigeration cycle. In the refrigerant circuit (11), a refrigerant discharged from the compressor (12) moves through the condenser (13), the expansion valve (14), and the evaporator (15) in this order, and is subsequently sucked into the compressor (12) and compressed.

In the cooling operation, the external fan (16) and the internal fan (17) operate. When the external fan (16) operates, external air that exists outside the transport container (1) is sucked into the external machine room (28) and moves through the condenser (13). In the condenser (13), a refrigerant dissipates heat to the external air and is condensed. When the internal fan (17) operates, internal air inside the load room (5) of the transport container (1) is sucked into the internal air flow path (29) and moves through the evaporator (15). In the evaporator (15), a refrigerant absorbs heat from the internal air and evaporates.

A flow of the internal air is described. The internal air that exists in the load room (5) flows into the primary flow path (29a) of the internal air flow path (29) via the intake port (26) and is blown out into the secondary flow path (29b) by the internal fan (17). The internal air that has flowed into the secondary flow path (29b) is cooled while moving through the evaporator (15), and is then blown out into the underfloor flow path (4) from the blow-out port (27) and flows into the load room (5) via the underfloor flow path (4).

In the internal air flow path (29), the primary flow path (29a) is positioned on an intake side of the internal fan (17) and the secondary flow path (29b) is positioned on a blow-out side of the internal fan (17). Therefore, during the operation of the internal fan (17), the air pressure of the secondary flow path (29b) is slightly higher than the air pressure of the primary flow path (29a).

-Operation of Internal Air Adjustment Device-

The internal air adjustment device (30) operates to adjust the composition of internal air (in the present embodiment, the oxygen concentration and the carbon dioxide concentration of the internal air) inside the load room (5) of the transport container (1). Here, the operation of the internal air adjustment device (30) of the present embodiment is described by using as an example a case in which a target range of the oxygen concentration of the internal air is 5%±1% and a target range of the carbon dioxide concentration of the internal air is 2%±1%.

<Outline of Operation of Internal Air Adjustment Device>

The internal air adjustment device (30) of the present embodiment performs an oxygen concentration reduction operation for reducing the oxygen concentration of the internal air inside the load room (5), a carbon dioxide concentration reduction operation for reducing the carbon dioxide concentration of the internal air inside the load room (5), and an oxygen concentration increasing operation for increasing the oxygen concentration of the internal air inside the load room (5).

At the time the loading of the goods (6) into the transport container (1) is completed, the composition of the internal air that exists inside the load room (5) is substantially the same as the composition of the atmosphere (nitrogen concentration: 78%, oxygen concentration: 21%, carbon dioxide concentration: 0.04%). Here, the internal air adjustment device (30) performs the oxygen concentration reduction operation for reducing the oxygen concentration of the internal air. When the oxygen concentration of the internal air reaches an upper limit value (6%) of the target range, the internal air adjustment device (30) stops the oxygen concentration reduction operation.

After the oxygen concentration of the internal air has reached 6% and an oxygen concentration reduction operation of the internal air adjustment device (30) has stopped, since plants, which are the goods (6), respire, at the same time that the oxygen concentration of the internal air is gradually reduced, the carbon dioxide concentration of the internal air is gradually increased.

When the carbon dioxide concentration of the internal air reaches an upper limit value (3%) of the target range, the internal air adjustment device (30) performs the carbon dioxide concentration reduction operation for reducing the carbon dioxide concentration of the internal air. When the carbon dioxide concentration of the internal air reaches a lower limit value of the target range (1%), the internal air adjustment device (30) stops the carbon dioxide concentration reduction operation.

When the oxygen concentration of the internal air reaches a lower limit value (4%) of the target range, the internal air adjustment device (30) performs the oxygen concentration increasing operation for increasing the oxygen concentration of the internal air. When the oxygen concentration of the internal air reaches the upper limit value (6%) of the target range, the internal air adjustment device (30) stops the oxygen concentration increasing operation.

In this way, in order to reduce the oxygen concentration of the internal air inside the load room (5) to the target range from 21% (the oxygen concentration of the atmosphere), the internal air adjustment device (30) performs the oxygen concentration reduction operation. In order to maintain the oxygen concentration and the carbon dioxide concentration of the internal air inside the load room (5) in their respective target ranges, the internal air adjustment device (30) repeats the carbon dioxide reduction operation and the oxygen concentration increasing operation as appropriate.

<Oxygen Concentration Reduction Operation>

The oxygen concentration reduction operation of the internal air adjustment device (30) is described with reference to FIGS. 3 to 5 as appropriate. In the oxygen concentration reduction operation, the first composition adjustment unit (40) supplies first external air having a low oxygen concentration into the load room (5), and the second composition adjustment unit (60) supplies first internal air having a low oxygen concentration into the load room (5).

In the oxygen concentration reduction operation, the controller (110) sets the first bypass valve (50) and the second bypass valve (70) to the respective first states (the states shown by the solid lines in FIG. 3), operates the first pump (36) and the second pump (37) by passing electric current through the driving motor (38) of the pump unit (35), and sets the ventilation exhaust valve (101) in an open state.

First, when the first pump (36) operates, external air that exists outside the transport container (1) moves through the air filter (47) and the external-side suction pipe (55) and is sucked into the first pump (36). The first pump (36) compresses and discharges the sucked-in external air. The pressure of the external air that is discharged by the first pump (36) is approximately twice the atmospheric pressure. The external air discharged from the first pump (36) flows in the first introducing pipe (52) and flows into the first introducing port (42) of the first separation module (41) as untreated external air.

In the first separation module (41), the untreated external air that has moved through the first introducing port (42) and flowed into the introducing room (82) flows into the hollow fiber-like gas separation membranes (85). A portion of the air that flows along the inner side of each hollow fiber-like gas separation membrane (85) passes through the gas separation membranes (85) and moves toward the secondary-side guide-out room (84) as second external air, and a remaining portion thereof flows into the primary-side guide-out room (83) as first external air. As described above, the gas separation membranes (85) have the property that the passing rate of nitrogen is lower than the passing rate of oxygen. Therefore, as shown in FIG. 5, the oxygen concentration of the first external air is lower than the oxygen concentration of the untreated external air, and the oxygen concentration of the second external air is higher than the oxygen concentration of the untreated external air.

The first external air that has flowed out into the first primary-side pipe (53) from the first primary-side guide-out port (43) of the first separation module (41) flows into the supply pipe (120). On the other hand, the second external air that has flowed out into the first secondary-side pipe (54) from the first secondary-side guide-out port (44) of the first separation module (41) is discharged to the outside of the transport container (1).

Next, when the second pump (37) is operated, internal air that exists inside the transport container (1) (specifically, internal air that exists in the secondary flow path (29b) of the container refrigerator (10)) moves through the internal-side suction pipe (75) and is sucked into the second pump (37). The second pump (37) compresses and discharges the sucked-in internal air. The pressure of the external air that is discharged by the second pump (37) is substantially slightly higher than the atmospheric pressure. The internal air discharged from the second pump (37) flows into the second introducing pipe (72) and flows into the second introducing port (62) of the second separation module (61) as untreated internal air.

In the second separation module (61), the untreated internal air that has moved through the second introducing port (62) and flowed into the introducing room (82) flows into the hollow fiber-like gas separation membranes (85). A portion of air that flows along the inner side of each hollow fiber-like gas separation membrane (85) passes through the gas separation membranes (85) and moves toward the secondary-side guide-out room (84) as second external air, and a remaining portion thereof flows into the primary-side guide-out room (83) as first internal air. As described above, the gas separation membranes (85) have the property that the passing rate of nitrogen is lower than the passing rate of oxygen. Therefore, as shown in FIG. 5, the oxygen concentration of the first internal air is lower than the oxygen concentration of the untreated internal air, and the oxygen concentration of the second internal air is higher than the oxygen concentration of the untreated internal air.

The first internal air that has flowed out into the second primary-side pipe (73) from the second primary-side guide-out port (63) of the second separation module (61) flows into the supply pipe (120). On the other hand, the second internal air that has flowed out into the second secondary-side pipe (74) from the second secondary-side guide-out port (64) of the second separation module (61) is discharged to the outside of the transport container (1).

As described above, the first external air that has flowed out from the first separation module (41) and the first internal air that has flowed out from the second separation module (61) flow into the supply pipe (120). Mixed air containing the first external air and the first internal air that flow through the supply pipe (120) flows into the secondary flow path (29b) of the container refrigerator (10) and is supplied into the load room (5) along with the air that flows through the secondary flow path (29b).

Figure 5:
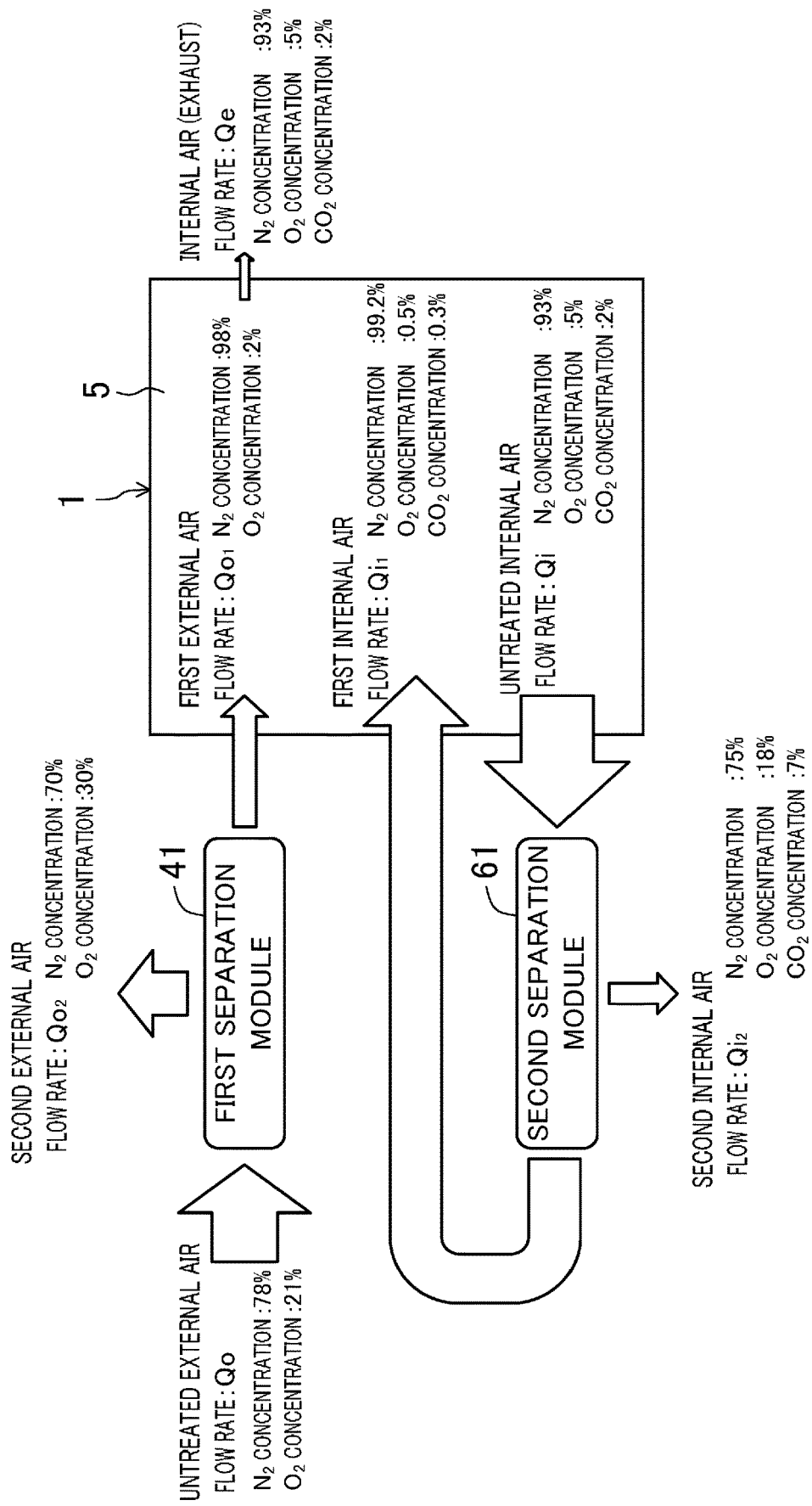
FIG. 5 is a block diagram showing an oxygen concentration reduction operation that is performed by the internal air adjustment device of the first embodiment.

Ordinarily, during the oxygen concentration reduction operation, a flow rate $Q_{o1}$ of the first external air that is supplied into the transport container (1) from the outside of the transport container (1) is higher than a flow rate $Q_{i2}$ of the second internal air that is discharged to the outside from the inside of the transport container (1) ($Q_{o1} > Q_{i2}$), and the air pressure inside the transport container (1) becomes positive (refer to FIG. 5). That is, the first composition adjustment unit (40) supplies the first external air into the transport container (1) so that the air pressure inside the transport container (1) becomes positive. Since the air pressure inside the transport container (1) becomes positive, a portion of the internal air moves through the ventilation exhaust pipe (100) and is discharged to the outside of the transport container (1).

In this way, in the oxygen concentration reduction operation, at the same time that the first external air having an oxygen concentration that is lower than the oxygen concentration of the atmosphere is supplied, the internal air inside the load room (5) is discharged to the outside of the transport container (1) via the ventilation exhaust pipe (100), and the oxygen concentration of the internal air inside the load room (5) is reduced by replacing the air inside the load room (5) with the first external air. In the oxygen concentration reduction operation, by discharging the second internal air having a high oxygen concentration and separated from the untreated internal air to the outside of the transport container (1), the oxygen concentration of the internal air inside the load room (5) is reduced.

<Carbon Dioxide Concentration Reduction Operation>

The carbon dioxide concentration reduction operation of the internal air adjustment device (30) is described with reference to FIGS. 3, 4, and 6 as appropriate. In the carbon dioxide concentration reduction operation, the first composition adjustment unit (40) supplies first external air having a low oxygen concentration into the load room (5), and the second composition adjustment unit (60) supplies first internal air having a low carbon dioxide concentration into the load room (5).

In the carbon dioxide concentration reduction operation, the controller (110) sets the first bypass valve (50) and the second bypass valve (70) to the respective first states (the states shown by the solid lines in FIG. 3), operates the first pump (36) and the second pump (37) by passing electric current through the driving motor (38) of the pump unit (35), and sets the ventilation exhaust valve (101) in an open state and the measurement on-off valve (126) in a closed state. The flow of air through each of the first composition adjustment unit (40) and the second composition adjustment unit (60) is the same as the flow of air when the oxygen concentration reduction operation is performed. However, in the carbon dioxide concentration reduction operation, the pressure of the external air that is discharged by the first pump (36) and the pressure of the internal air that is discharged by the second pump (37) are substantially slightly higher than the atmospheric pressure.

In the first composition adjustment unit (40), untreated external air that has flowed into the first separation module (41) is separated into first external air having a nitrogen concentration that is higher than the nitrogen concentration of the untreated external air and an oxygen concentration that is lower than the oxygen concentration of the untreated external air and second external air having a nitrogen concentration that is lower than the nitrogen concentration of the untreated external air and an oxygen concentration that is higher than the oxygen concentration of the untreated external air. The first external air is supplied into the transport container (1) and the second external air is discharged to the outside of the transport container (1). The carbon dioxide concentration of the untreated external air is substantially the same as the carbon dioxide concentration (0.04%) of the atmosphere. Therefore, the carbon dioxide concentration of the first external air can be considered as being substantially zero.

In the second composition adjustment unit (60), untreated internal air that has flowed into the second separation module (61) is separated into first internal air having a nitrogen concentration that is higher than the nitrogen concentration of the untreated internal air and an oxygen concentration and a carbon dioxide concentration that are lower than the oxygen concentration and the carbon dioxide concentration of the untreated internal air and second internal air having a nitrogen concentration that is lower than the nitrogen concentration of the untreated internal air and an oxygen concentration and a carbon dioxide concentration that are higher than the oxygen concentration and the carbon dioxide concentration of the untreated internal air. Then, the first internal air is supplied into the transport container (1) and the second internal air is discharged to the outside of the transport container (1).

Figure 6:
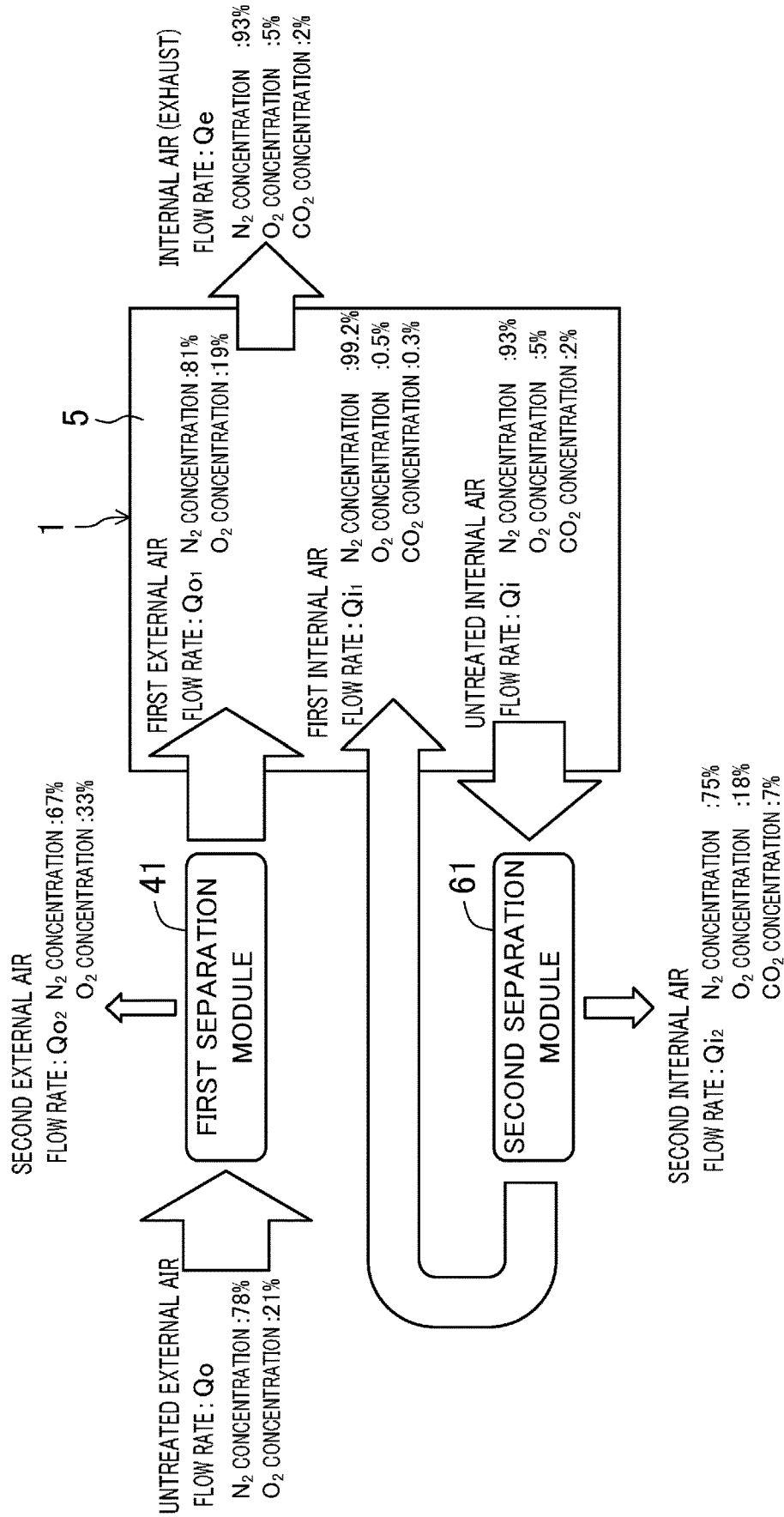
FIG. 6 is a block diagram showing a carbon dioxide concentration reduction operation that is performed by the internal air adjustment device of the first embodiment.

Ordinarily, when the carbon dioxide concentration reduction operation is being performed, similarly to when the oxygen concentration reduction operation is performed, a flow rate $Q_{o1}$ of the first external air is higher than a flow rate $Q_{i2}$ of the second internal air ($Q_{o1} > Q_{i2}$), and the air pressure inside the transport container (1) becomes a positive pressure (refer to FIG. 6). That is, the first composition adjustment unit (40) supplies the first external air into the transport container (1) so that the air pressure inside the transport container (1) becomes positive. Since the air pressure inside the transport container (1) becomes positive, a portion of the internal air inside the load room (5) moves through the ventilation exhaust pipe (100) and is discharged to the outside of the transport container (1).

In this way, in the carbon dioxide concentration reduction operation, at the same time that the first external air having a very low carbon dioxide concentration is supplied, the internal air is discharged to the outside of the transport container (1) via the ventilation exhaust pipe (100), and the carbon dioxide concentration of the internal air inside the load room (5) is reduced by replacing the air inside the load room (5) with the first external air. In the carbon dioxide concentration reduction operation, by discharging the second internal air having a high carbon dioxide concentration and separated from the untreated internal air to the outside of the transport container (1), the carbon dioxide concentration of the internal air inside the load room (5) is reduced.

<Oxygen Concentration Increasing Operation>

The oxygen concentration increasing operation of the internal air adjustment device (30) is described with reference to FIG. 3. In the oxygen concentration increasing operation, external air sucked in by the first composition adjustment unit (40) from the outside of the transport container (1) is supplied as it is into the load room (5), and the second composition adjustment unit (60) sends back internal air sucked in by the second composition adjustment unit (60) from the inside of the transport container (1) as it is into the load room (5).

In the oxygen concentration increasing operation, the controller (110) sets the first bypass valve (50) and the second bypass valve (70) to the respective second states (the states shown by the broken lines in FIG. 3), operates the first pump (36) and the second pump (37) by passing electric current through the driving motor (38) of the pump unit (35), and sets the ventilation exhaust valve (101) in an open state and the measurement on-off valve (126) in a closed state.

In the first composition adjustment unit (40), external air discharged from the first pump (36) flows into the first bypass pipe (51) and, with its nitrogen concentration and oxygen concentration maintained, the external air flows into the first primary-side pipe (53) and then moves through the supply pipe (120) and is supplied into the transport container (1). On the other hand, in the second composition adjustment unit (60), after internal air sucked into the second pump (37) has been discharged from the second pump (37), the internal air moves through the second bypass pipe (71) and flows into the second primary-side pipe (73), and then moves through the supply pipe (120) and returns to the inside of the transport container (1). A portion of the internal air inside the load room (5) moves through the ventilation exhaust pipe (100) and is discharged to the outside of the transport container (1).

In this way, in the oxygen concentration increasing operation, by supplying the external air having an oxygen concentration that is higher than the oxygen concentration of the internal air into the transport container (1), the oxygen concentration inside the load room (5) is increased.

-Controlling Operation of Controller-

The controller (110) of the internal air adjustment device (30) monitors the measured values of the oxygen sensor (91) and the carbon dioxide sensor (92). When the internal air adjustment device (30) operates as described above, the controller (110) controls the structural equipment of the internal air adjustment device (30) based on the measured values of the oxygen sensor (91) and the carbon dioxide sensor (92) so as to maintain the oxygen concentration and the carbon dioxide concentration of the internal air in their respective target ranges.

It is not actually possible for the transport container (1) to be completely airtight. Therefore, when the pressure inside the transport container (1) becomes negative, the external air (that is, the atmospheric air) moves through a gap of the transport container and enters the transport container (1). When, during the oxygen concentration reduction operation, the external air enters the transport container (1), the speed of reduction of the oxygen concentration of the internal air (that is, the amount of reduction of the oxygen concentration per unit time) may become very low, or the oxygen concentration of the internal air may be increased. In addition, when, during the carbon dioxide concentration reduction operation, the external air enters the transport container (1), although plants, which are the goods (6), consume oxygen by respiring, the oxygen concentration of the internal air may be increased. Therefore, in such a case, the controller (110) of the internal air adjustment device (30) performs a positive pressure maintaining operation for maintaining the air pressure inside the transport container (1) at a positive pressure.

<Positive Pressure Maintaining Operation>

During the oxygen concentration reduction operation and the carbon dioxide reduction operation, the controller (110) monitors a measured value of the oxygen sensor (91). When a determination condition in which, during the oxygen concentration reduction operation and the carbon dioxide concentration reduction operation, the speed of reduction of the measured value of the oxygen sensor (91) (that is, the amount of reduction of the measured value per unit time) is less than a predetermined standard value is established, the controller (110) determines that the external air has entered the transport container (1) due to the air pressure inside the transport container (1) becoming negative. When the measured value of the oxygen sensor (91) is increased, the speed of reduction of the measured value of the oxygen sensor (91) is a negative value.

When the determination condition above is established, the controller (110) performs the positive pressure maintaining operation for increasing the flow rate of the first external air that is supplied into the transport container (1) by the first composition adjustment unit (40). The controller (110) performs an operation of increasing the opening degree of the first adjustment valve (46) provided in the first composition adjustment unit (40) as the positive pressure maintaining operation.

In the positive pressure maintaining operation, the controller (110) reads the measured value of the first pressure sensor (45), and sets a value that is less than the read measured value of the first pressure sensor (45) as a target pressure. Then, the controller (110) adjusts the opening degree of the first adjustment valve (46) so that the measured value of the first pressure sensor (45) becomes the target pressure. As the opening degree of the first adjustment valve (46) is increased, the measured value of the first pressure sensor (45) is reduced. Therefore, when the opening degree of the first adjustment valve (46) is adjusted so that the measured value of the first pressure sensor (45) becomes the target pressure, the opening degree of the first adjustment valve (46) is gradually increased.

In general, the gas separation membranes (85) have the property that, as the difference between the pressure of air that contacts a primary-side surface thereof and the pressure of air that contacts a secondary-side surface thereof is reduced, components of air that pass through the gas separation membranes (85) are reduced in amount". When the opening degree of the first adjustment valve (46) is increased, the pressure of air that flows along the inner side (the primary side) of the gas separation membranes (85) of the first separation module (41) is reduced, and the components of the air that pass through the gas separation membranes (85) are reduced in amount. Therefore, when the opening degree of the first adjustment valve (46) is increased, the flow rate of the first external air that flows out from the first separation module (41) is increased. As a result, the flow rate of the first external air that is supplied into the transport container (1) by the first composition adjustment unit (40) is increased, and the air pressure inside the transport container (1) is increased.

As described above, when the opening degree of the first adjustment valve (46) is increased, the components of the air that pass through the gas separation membranes (85) are reduced in amount. Therefore, when the opening degree of the first adjustment valve (46) is increased by the controller (110) performing the positive pressure maintaining operation, the oxygen concentration of the first external air is increased. However, even in this case, the oxygen concentration of the first external air is kept lower than the oxygen concentration of the atmosphere. Therefore, by suppressing entry of the external air into the load room by causing the air pressure inside the transport container (1) to be a positive pressure, the oxygen concentration of the internal air inside the load room (5) is reduced.

Effects of First Embodiment

The internal air adjustment device (30) of the present embodiment adjusts the composition of the internal air inside the transport container (1) while maintaining the air pressure inside the transport container (1) at a positive pressure. Therefore, according to the present embodiment, even if the airtightness of the transport container (1) is not that high, it is possible to prevent entry of the external air (atmospheric air) into the transport container (1), as a result of which it is possible to properly adjust the composition of the internal air inside the transport container (1).

In particular, during the carbon dioxide concentration reduction operation, while properly controlling the carbon dioxide concentration of the internal air inside the load room (5) by discharging the second internal air having a high carbon dioxide concentration and separated from the untreated internal air by the second composition adjustment unit (60), the air pressure inside the transport container (1) is maintained at a positive pressure as a result of the first composition adjustment unit (40) supplying the first external air into the transport container (1). Therefore, according to the present embodiment, while preventing entry of the external air (atmospheric air) into the transport container (1) and suppressing an increase in the oxygen concentration of the internal air, it is possible to properly control the carbon dioxide concentration of the internal air.

During the carbon dioxide concentration reduction operation, at the same time that the second composition adjustment unit (60) discharges the second internal air having a carbon dioxide concentration that is higher than the carbon dioxide concentration of the untreated internal air to the outside of the transport container (1), the first composition adjustment unit (40) supplies the first external air having an oxygen concentration that is lower than the oxygen concentration of the untreated external air into the transport container (1). Therefore, compared to when the untreated external air is supplied into the transport container (1) as it is, it is possible to suppress variations in the oxygen concentration of the internal air in the transport container (1) and to maintain the composition of the internal air close to a proper value.

During the oxygen concentration reduction operation, at the same time that the first composition adjustment unit (40) supplies the first external air having an oxygen concentration that is lower than the oxygen concentration of the untreated external air into the transport container (1), the second composition adjustment unit (60) discharges the second internal air having an oxygen concentration that is higher than the oxygen concentration of the untreated internal air to the outside of the transport container (1). Therefore, according to the present embodiment, compared to when the oxygen concentration of the internal air inside the load room (5) is reduced by supplying the first external air, it is possible to reduce the time required to reduce the oxygen concentration of the internal air inside the load room (5) to the target range.

Second Embodiment

A second embodiment is described. An internal air adjustment device (30) of the present embodiment differs from the internal air adjustment device (30) of the first embodiment in the structure of a first composition adjustment unit (40) and the structure of a second composition adjustment unit (60). Here, the differences of the internal air adjustment device (30) of the present embodiment from the internal air adjustment device (30) of the first embodiment are described.

<First Composition Adjustment Unit>

Figure 7:
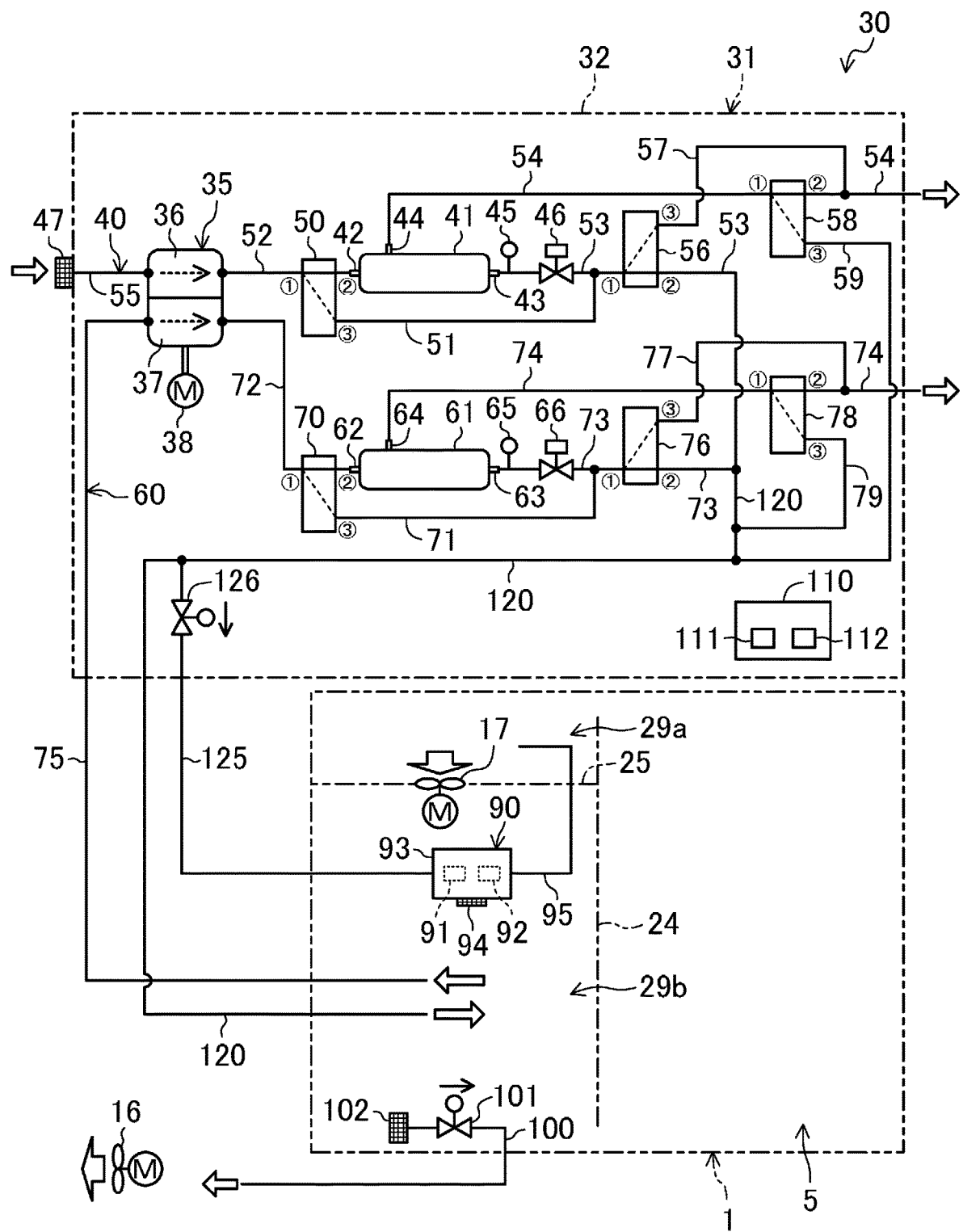
FIG. 7 is a pipe system diagram showing a structure of an internal air adjustment device of a second embodiment.

As shown in FIG. 7, a first primary-side switching valve (56), a first primary-side discharge pipe (57), a first secondary-side switching valve (58), and a first secondary-side supply pipe (59) are added to the first composition adjustment unit (40) of the present embodiment.

The first primary-side switching valve (56) and the first secondary-side switching valve (58) are each a switching valve having three ports. The first primary-side switching valve (56) and the first secondary-side switching valve (58) are each configured to be switched between a first state in which a first port communicates with a second port and is blocked from a third port (a state shown by a solid line in FIG. 7) and a second state in which the first port communicates with the third port and is blocked from the second port (a state shown by a broken line in FIG. 7).

The first primary-side switching valve (56) is disposed at a first primary-side pipe (53). In the first primary-side pipe (53), the first primary-side switching valve (56) is disposed closer than an outlet end of a first bypass pipe (51) to a supply pipe (120). The first port of the first primary-side switching valve (56) is connected to a first adjustment valve (46), and the second port of the first primary-side switching valve (56) is connected to the supply pipe (120). One end of the first primary-side discharge pipe (57) is connected to the third port of the first primary-side switching valve (56). The other end of the first primary-side discharge pipe (57) is connected to a first secondary-side pipe (54).

The first secondary-side switching valve (58) is disposed at the first secondary-side pipe (54). In the first secondary-side pipe (54), the first secondary-side switching valve (58) is disposed closer than the other end of the first primary-side discharge pipe (57) to a first separation module (41). The first port of the first secondary-side switching valve (58) is connected to a first secondary-side guide-out port (44) of the first separation module (41), and the second port of the first secondary-side switching valve (58) communicates with an external machine room (28) of the transport container (1) via the first secondary-side pipe (54). One end of the first secondary-side supply pipe (59) is connected to the third port of the first secondary-side switching valve (58). The other end of the first secondary-side supply pipe (59) is connected to the supply pipe (120).

<Second Composition Adjustment Unit>

A second primary-side switching valve (76), a second primary-side discharge pipe (77), a second secondary-side switching valve (78), and a second secondary-side supply pipe (79) are added to the second composition adjustment unit (60) of the present embodiment.

The second primary-side switching valve (76) and the second secondary-side switching valve (78) are each a switching valve having three ports. The second primary-side switching valve (76) and the second secondary-side switching valve (78) are each configured to be switched between a first state in which a first port communicates with a second port and is blocked from a third port (a state shown by a solid line in FIG. 7) and a second state in which the first port communicates with the third port and is blocked from the second port (a state shown by a broken line in FIG. 7).

The second primary-side switching valve (76) is disposed at a second primary-side pipe (73). In the second primary-side pipe (73), the second primary-side switching valve (76) is disposed closer than an outlet end of a second bypass pipe (71) to the supply pipe (120). The first port of the second primary-side switching valve (76) is connected to a second adjustment valve (66), and the second port of the second primary-side switching valve (76) is connected to the supply pipe (120). One end of the second primary-side discharge pipe (77) is connected to the third port of the second primary-side switching valve (76). The other end of the second primary-side discharge pipe (77) is connected to a second secondary-side pipe (74).

The second secondary-side switching valve (78) is disposed at the second secondary-side pipe (74). In the second secondary-side pipe (74), the second secondary-side switching valve (78) is disposed closer than the other end of the second primary-side discharge pipe (77) to a second separation module (61). The first port of the second secondary-side switching valve (78) is connected to a second secondary-side guide-out port (64) of the second separation module (61), and the second port of the second secondary-side switching valve (78) communicates with the external machine room (28) of the transport container (1) via the second secondary-side pipe (74). One end of the second secondary-side supply pipe (79) is connected to the third port of the second secondary-side switching valve (78). The other end of the second secondary-side supply pipe (79) is connected to the supply pipe (120).

-Operation-

In the first composition adjustment unit (40), when both the first primary-side switching valve (56) and the first secondary-side switching valve (58) are set in the first states (the states shown by the solid lines in FIG. 7), first external air moves through the first primary-side pipe (53) and is supplied into the transport container (1), and second external air moves through the second secondary-side pipe (74) and is discharged to the outside of the transport container (1). On the other hand, when both the first primary-side switching valve (56) and the first secondary-side switching valve (58) are set in the second states (the states shown by the broken lines in FIG. 7), the first external air moves through the first primary-side discharge pipe (57) and is discharged to the outside of the transport container (1), and the second external air moves through the first secondary-side supply pipe (59) and is supplied into the transport container (1).

In the second composition adjustment unit (60), when both the second primary-side switching valve (76) and the second secondary-side switching valve (78) are set in the first states (the states shown by the solid lines in FIG. 7), first internal air moves through the second primary-side pipe (73) and is supplied into the transport container (1), and second internal air moves through the second secondary-side pipe (74) and is discharged to the outside of the transport container (1). On the other hand, when both the second primary-side switching valve (76) and the second secondary-side switching valve (78) are set in the second states (the states shown by the broken lines in FIG. 7), the first internal air moves through the second primary-side discharge pipe (77) and is discharged to the outside of the transport container (1), and the second internal air moves through the second secondary-side supply pipe (79) and is supplied into the transport container (1).

Third Embodiment

An internal air adjustment device (30) of a third embodiment is described. The internal air adjustment device (30) of the present embodiment is a device in which a first composition adjustment unit (40) and a controller (110) differ from those of the internal air adjustment device (30) of the first embodiment. Here, the differences of the internal air adjustment device (30) of the third embodiment from the internal air adjustment device (30) of the first embodiment is described.

-Structure of First Composition Adjustment Unit-

Similarly to the first composition adjustment unit (40) of the first embodiment, the first composition adjustment unit (40) of the present embodiment is configured to separate external air sucked in from the outside of a transport container (1) (untreated external air) into first external air and second external air. The first composition adjustment unit (40) of the present embodiment is configured to separate the untreated external air into the first external air and the second external air by a PSA (Pressure Swing Adsorption) method, and differs from the first composition adjustment unit (40) of the first embodiment on this point.

Figure 8:
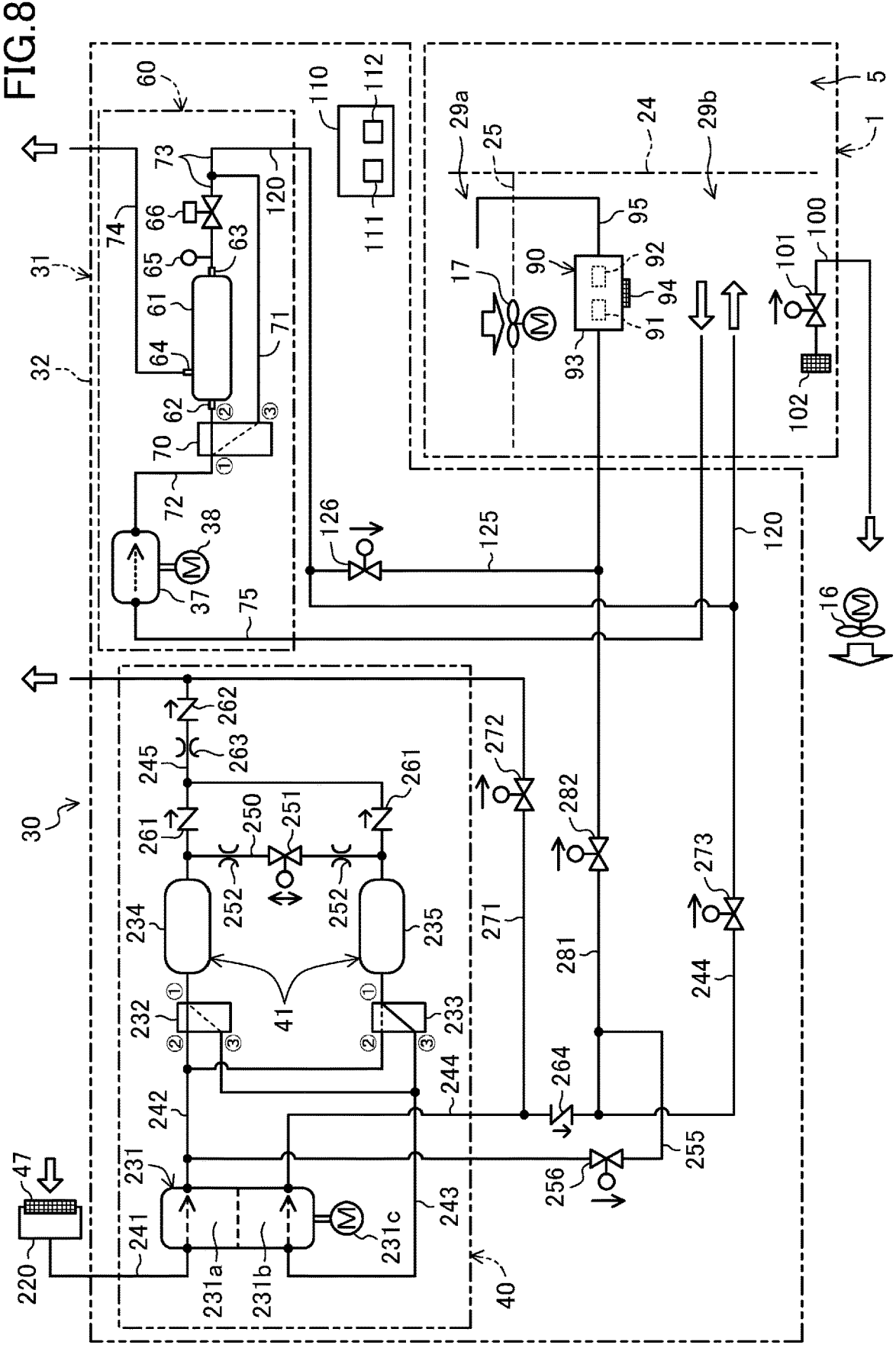
FIG. 8 is a pipe system diagram showing a structure of an internal air adjustment device of a third embodiment.

As shown in FIG. 8, the first composition adjustment unit (40) of the present embodiment includes an air pump (231) instead of the first pump (36) of the pump unit (35). That is, although, in the internal air adjustment device (30) of the present embodiment, a pump unit (35) includes a second pump (37) and a driving motor (38), the pump unit (35) does not include a first pump (36). The first composition adjustment unit (40) of the present embodiment also includes a first directional control valve (232) and a second directional control valve (233), and a first adsorption column (234) and a second adsorption column (235). As described below, an adsorbent that adsorbs nitrogen in air is provided in each adsorption column (234, 235).

<Air Pump>

The air pump (231) is disposed in an internal space of a unit case (32). The air pump (231) includes a first pump mechanism (231a) and a second pump mechanism (231b) that suck in, press, and discharge air. The first pump mechanism (231a) and the second pump mechanism (231b) are each an oilless pump that does not use a lubricant. The first pump mechanism (231a), which is a compressing portion, and the second pump mechanism (231b), which is a decompressing portion, are both connected to a driving shaft of a driving motor (231c). The first pump mechanism (231a) and the second pump mechanism (231b) are each rotationally driven by the driving motor (231c) to suck in and compress air from an intake port, and discharge the compressed air out from a discharge port.

<Outside Air Pipe, Discharge Pipe, Filter Unit>

One end of an outside air pipe (241) that defines an outside air passage is connected to the intake port of the first pump mechanism (231a). The outside air pipe (241) is provided so as to extend through the unit case (32). The other end of the outside air pipe (241) that is positioned outside the unit case (32) is connected to a filter unit (220).

The filter unit (220) includes an air filter (47). The air filter (47) is a filter for trapping, for example, dust or salt contained in external air. In the present embodiment, a water-proof membrane filter having ventilation characteristics is used as the air filter (47). The filter unit (220) is a box-shaped member and introduces air that has moved through the air filter (47) (external air) to the outside air pipe (241). Although not shown, the filter unit (220) is disposed on a downstream side with respect to a condenser (13) in an external machine room (28).

One end of a discharge pipe (242) that defines a discharge passage is connected to the discharge port of the first pump mechanism (231a). The discharge pipe (242) is divided into two branch pipes at the other end, with one of the branch pipes connected to the first directional control valve (232) and the other of the branch pipes connected to the second directional control valve (233).

<Suck-In Pipe, Supply Pipe>

One end of a suck-in pipe (243) that defines a suck-in passage is connected to the intake port of the second pump mechanism (231b). The suck-in pipe (243) is divided into two branch pipes at the other end, with one of the branch pipes connected to the first directional control valve (232)

and the other of the branch pipes connected to the second directional control valve (233).

One end of a supply connection pipe (244) that defines a supply passage is connected to the discharge port of the second pump mechanism (231*b*). The other end of the supply connection pipe (244) is connected to a supply pipe (120).

A check valve (264) and a supply-side on-off valve (273) are provided at the supply connection pipe (244) in this order from one end to the other end thereof. The check valve (264) only allows flow of air toward the other end from the one end of the supply connection pipe (244) and prevents flow of air in the reverse direction. The supply-side on-off valve (273) is an on-off valve constituted by an electromagnetic valve.

<Directional Control Valves>

The first directional control valve (232) and the second directional control valve (233) are each a switching valve having three ports. Each directional control valve (232, 233) is configured to be switched between a first state in which a first port communicates with a second port and is blocked from a third port and a second state in which the first port communicates with the third port and is blocked from the second port.

The first port of the first directional control valve (232) is connected to one end of the first adsorption column (234). The one branch pipe of the discharge pipe (242) is connected to the second port of the first directional control valve (232), and the other branch pipe of the suck-in pipe (243) is connected to the third port of the first directional control valve (232). The first directional control valve (232) switches the first adsorption column (234) between a state in which the first adsorption column (234) communicates with the first pump mechanism (231*a*) and a state in which the first adsorption column (234) communicates with the second pump mechanism (231*b*).

The first port of the second directional control valve (233) is connected to one end of the second adsorption column (235). The other branch pipe of the discharge pipe (242) is connected to the second port of the second directional control valve (233), and the one branch pipe of the suck-in pipe (243) is connected to the third port of the second directional control valve (233). The second directional control valve (233) switches the second adsorption column (235) between a state in which the second adsorption column (235) communicates with the first pump mechanism (231*a*) and a state in which the second adsorption column (235) communicates with the second pump mechanism (231*b*).

<Adsorption Columns>

The first adsorption column (234) and the second adsorption column (235) are each a member including a cylindrical container having both ends closed and an adsorbent with which the container is filled.

The adsorbent with which each adsorption column (234, 235) is filled has the property of adsorbing a nitrogen component in a compressed state where the pressure is higher than the atmospheric pressure and desorbing a nitrogen component in a decompressed state where the pressure is lower than the atmospheric pressure. In the present embodiment, as the adsorbent, for example, porous zeolite having pores having a pore diameter that is smaller than the molecular diameter of nitrogen molecules (3.0 angstroms) and a pore diameter that is larger than the molecular diameter of oxygen molecules (2.8 angstroms) is used.

In the first composition adjustment unit (40) of the present embodiment, the first adsorption column (234) and the second adsorption column (235) constitute a first separation unit (41). The two adsorption columns (234, 235) that constitute the first separation unit (41) separate untreated external air into first external air having a nitrogen concentration that is higher than that of the untreated external air and an oxygen concentration that is lower than that of the untreated external air and second external air having a nitrogen concentration that is lower than that of the untreated external air and an oxygen concentration that is higher than that of the untreated external air.

<Oxygen Discharge Pipe>

An oxygen discharge pipe (245) that defines an oxygen discharge passage is divided into two branch pipes at one end, with one of the branch pipes connected to the other end of the first adsorption column (234) and the other of the branch pipes connected to the second adsorption column (235). Each branch pipe of the oxygen discharge pipe (245) is provided with one check valve (261). Each check valve (261) allows the flow of air flowing out from a corresponding one of the adsorption columns (234, 235) and prevents the flow of air in the reverse direction.

The oxygen discharge pipe (245) is provided so as to extend through the unit case (32). The other end of the oxygen discharge pipe (245) opens into an external space of the transport container (1). A check valve (262) and an orifice (263) are provided at a collecting portion of the oxygen discharge pipe (245). The check valve (262) is disposed closer than the orifice (263) to the other end of the oxygen discharge pipe (245). The check valve (262) allows the flow of air toward the other end of the oxygen discharge pipe (245) and prevents the flow of air in the reverse direction.

<Purge Pipe>

A purge pipe (250) that defines a purge passage is connected to each branch pipe of the oxygen discharge pipe (245). One end of the purge pipe (250) is connected to the branch pipe that is connected to the first adsorption column (234) and the other end of the purge pipe (250) is connected to the branch pipe that is connected to the second adsorption column (235). The one end of the purge pipe (250) is connected at a location between the first adsorption column (234) and the check valve (261). The other end of the purge pipe (250) is connected at a location between the second adsorption column (235) and the check valve (261).

A purge valve (251) is provided at the purge pipe (250). The purge valve (251) is an on-off valve constituted by an electromagnetic valve. The purge valve (251) is opened when making the pressure of the first adsorption column (234) and the pressure of the second adsorption column (235) equal to each other. One orifice (252) is provided on each of two sides of the purge valve (251) at the purge pipe (250).

<Exhaust Connection Pipe>

An exhaust connection pipe (271) that defines an exhaust connection passage is connected to the supply connection pipe (244). One end of the exhaust connection pipe (271) is connected to the supply connection pipe (244) and the other end of the exhaust connection pipe (271) is connected to the oxygen discharge pipe (245). The one end of the exhaust connection pipe (271) is connected at a location between the check valve (264) and the second pump mechanism (231*b*) at the supply connection pipe (244). The other end of the exhaust connection pipe (271) is connected closer than the check valve (262) at the oxygen discharge pipe (245) to an external side.

An exhaust on-off valve (272) is provided at the exhaust connection pipe (271). The exhaust on-off valve (272) is an on-off valve constituted by an electromagnetic valve. The exhaust on-off valve (272) is opened when air that flows through the supply connection pipe (244) is discharged to the outside of the transport container.

<Measurement Connection Pipe>

A measurement connection pipe (281) that defines a measurement passage is connected to the supply connection pipe (244). The measurement connection pipe (281) is a pipe for connecting the first composition adjustment unit (40) to a sensor unit (90).

One end of the measurement connection pipe (281) is connected to the supply connection pipe (244), and the other end of the measurement connection pipe (281) is connected to a measurement pipe (125). The one end of the measurement connection pipe (281) is connected at a location between the supply-side on-off valve (273) and the check valve (264) at the supply connection pipe (244). The other end of the measurement connection pipe (281) is connected at a location between the sensor unit (90) and the measurement on-off valve (126) at the measurement pipe (125).

A measurement on-off valve (282) is provided at the measurement connection pipe (281). The measurement on-off valve (282) is an on-off valve constituted by an electromagnetic valve. The measurement on-off valve (282) is opened when sending air flowing through the supply connection pipe (244) to the sensor unit (90).

<Bypass Pipe>

A bypass connection pipe (255) that defines a bypass passage is connected to the discharge pipe (242). One end of the bypass connection pipe (255) is connected to the discharge pipe (242), and the other end of the bypass connection pipe (255) is connected to the measurement connection pipe (281). The one end of the bypass connection pipe (255) is connected at a location closer than a branched location of the discharge pipe (242) to the first pump mechanism (231a). The other end of the bypass connection pipe (255) is connected at a location between one end of the measurement connection pipe (281) and the measurement on-off valve (282). The bypass connection pipe (255) defines a first bypass passage for supplying external air into the internal space of the transport container (1) by causing the external air to bypass the first adsorption column (234) and the second adsorption column (235).

A bypass on-off valve (256) is provided at the bypass connection pipe (255). The bypass on-off valve (256) is an on-off valve constituted by an electromagnetic valve. The bypass on-off valve (256) constitutes a first bypass valve mechanism for changing the flow rate of the external air that flows into the bypass connection pipe (255). The bypass on-off valve (256) is opened when supplying the external air discharged by the first pump mechanism (231a) into the load room (5) without changing the composition of the external air.

-Operation of First Composition Adjustment Unit-

An operation of the first composition adjustment unit (40) of the present embodiment is described.

The first composition adjustment unit (40) of the present embodiment separates untreated external air into first external air and second external air by alternately repeating a first operation and a second operation, which are described below, every predetermined time (for example, 14.5 seconds). Similarly to the first composition adjustment unit (40) of the first embodiment, the first composition adjustment unit (40) of the present embodiment separates untreated external air into first external air and second external air in each of an oxygen concentration reduction operation and a carbon dioxide concentration reduction operation of the internal air adjustment device (30).

<First Operation>

Figure 9:
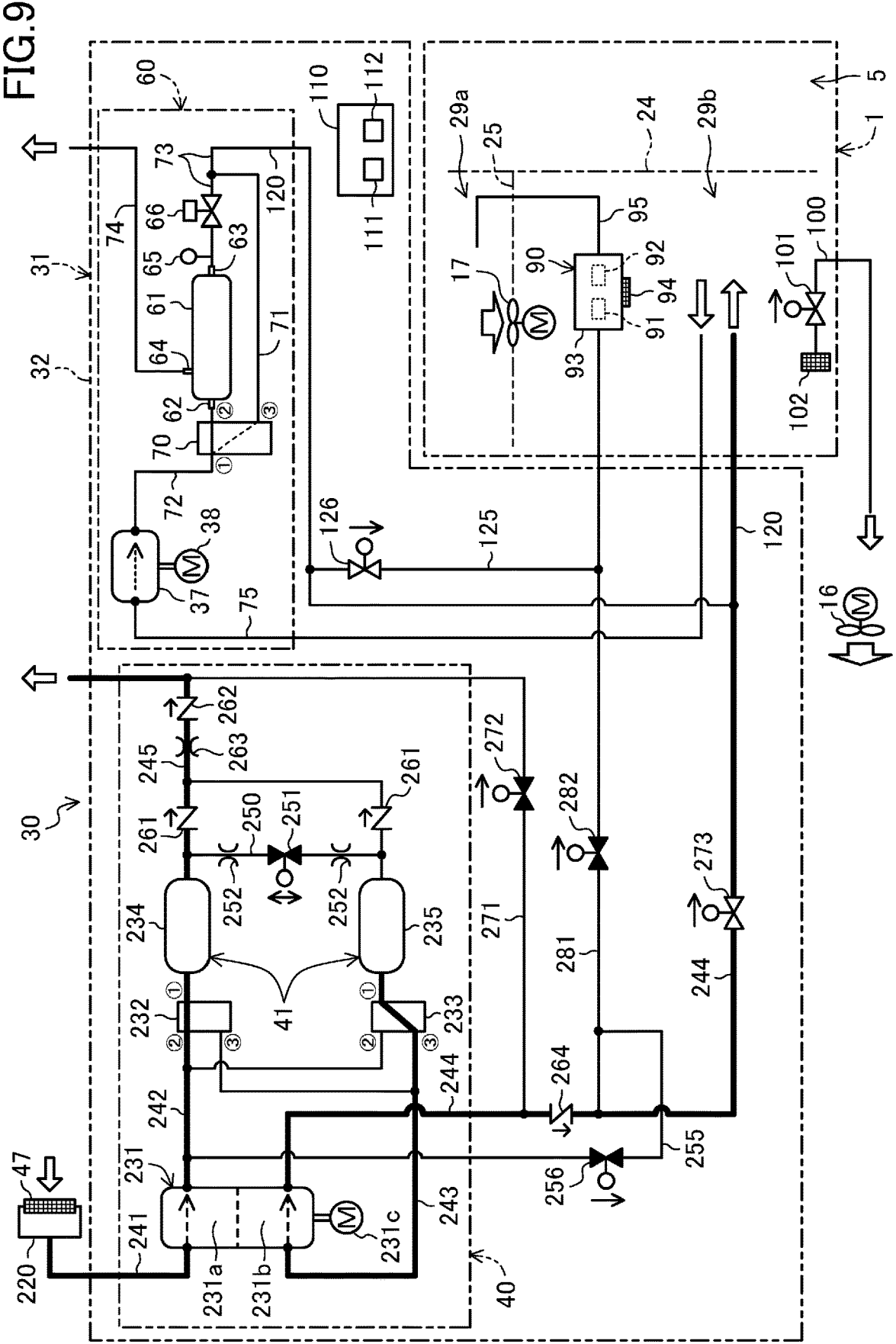
FIG. 9 is a pipe system diagram of the internal air adjustment device showing a first composition adjustment unit of the third embodiment in a first operating state.

As shown in FIG. 9, in the first operation, the first directional control valve (232) is set in the first state, and the second directional control valve (233) is set in the second state. As a result, the discharge port of the first pump mechanism (231a) is connected to the first adsorption column (234), and the second adsorption column (235) is connected to the intake port of the second pump mechanism (231b). In the first operation, the supply-side on-off valve (273) is opened, and the remaining on-off valves (251, 256, 272, 282) are closed. In the first operation, an adsorption operation of the first adsorption column (234) and a desorption operation of the second adsorption column (235) are performed.

The first pump mechanism (231a) sucks in untreated external air from the outside air pipe (241) and compresses the untreated external air to supply the compressed untreated external air into the first adsorption column (234). In the first adsorption column (234), nitrogen that is contained in the supplied untreated external air is adsorbed onto an adsorbent. As a result, in the first adsorption column (234), second external air having a nitrogen concentration that is lower than that of the untreated external air and an oxygen concentration that is higher than that of the untreated external air is produced. The second external air flows out from the first adsorption column (234), flows through the oxygen discharge pipe (245), and is discharged to external space as discharge air.

On the other hand, the second pump mechanism (231b) sucks in air from the second adsorption column (235). In the second adsorption column (235), internal pressure therein is reduced and nitrogen is desorbed from an adsorbent. As a result, first external air having a nitrogen concentration that is higher than that of the untreated external air and an oxygen concentration that is lower than that of the untreated external air is produced. The first external air flows into the suck-in pipe (243) from the first adsorption column (234) and is sucked into the second pump mechanism (231b). The second pump mechanism (231b) compresses the sucked-in first external air and discharges it into the supply connection pipe (244). The first external air flows through the supply connection pipe (244) as supply air, and, after merging with air that flows through the supply pipe (120), is supplied into internal space.

<Second Operation>

Figure 10:
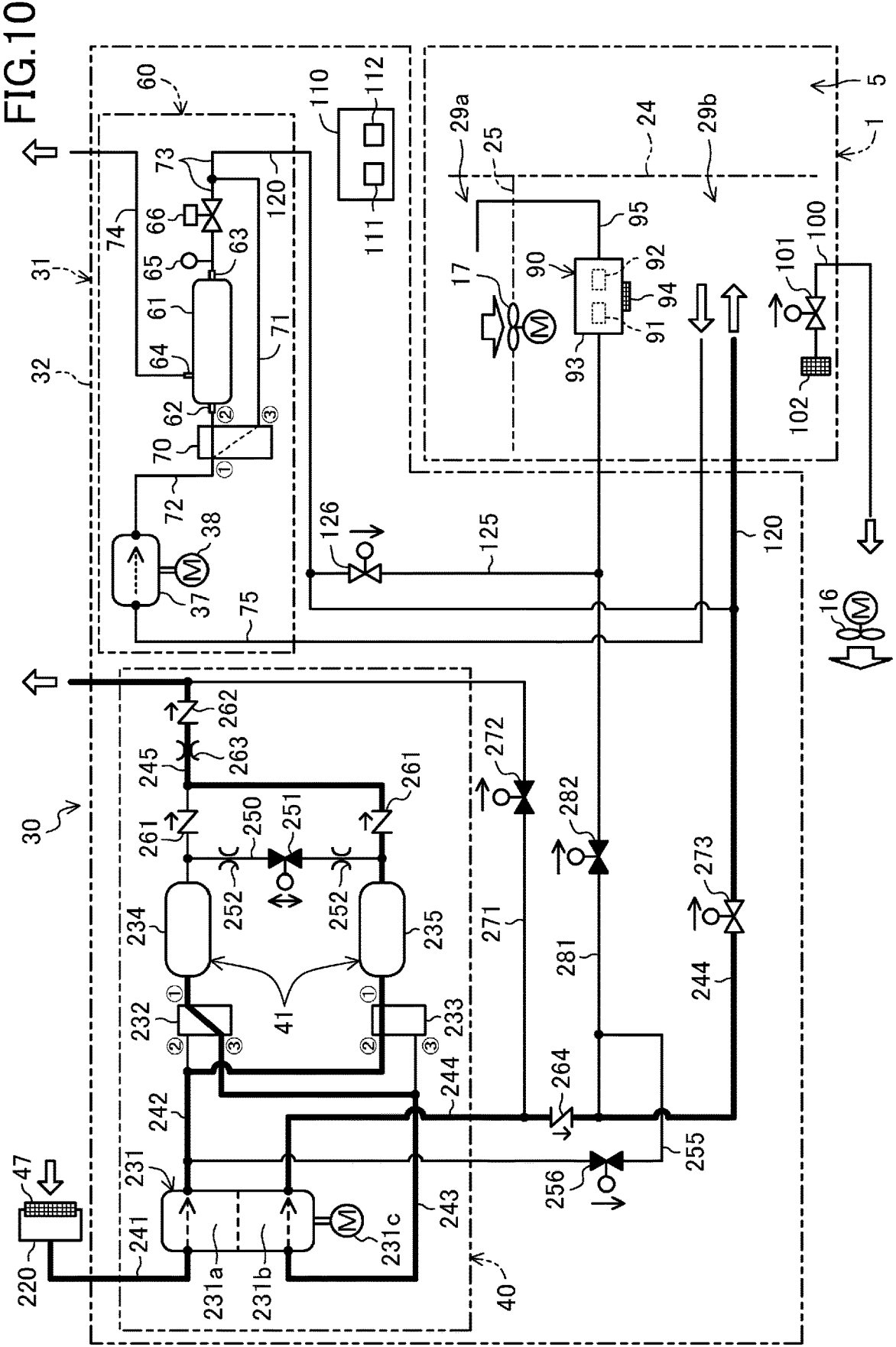
FIG. 10 is a pipe system diagram of the internal air adjustment device showing the first composition adjustment unit of the third embodiment in a second operating state.

As shown in FIG. 10, in the second operation, the first directional control valve (232) is set in the second state, and the second directional control valve (233) is set in the first state. As a result, the discharge port of the first pump mechanism (231a) is connected to the second adsorption column (235), and the first adsorption column (234) is connected to an intake port of the second pump mechanism (231b). In the second operation, the supply-side on-off valve (273) is opened, and the remaining on-off valves (251, 256, 272, 282) are closed. In the second operation, a desorption operation of the first adsorption column (234) and an adsorption operation of the second adsorption column (235) are performed.

The first pump mechanism (231a) sucks in untreated external air from the outside air pipe (241) and compresses the untreated external air to supply the compressed untreated external air into the second adsorption column (235). In the second adsorption column (235), nitrogen that is contained in the supplied untreated external air is adsorbed onto an adsorbent. As a result, in the second adsorption column (235), second external air having a nitrogen concentration that is lower than that of the untreated external air and an oxygen concentration that is higher than that of the untreated external air is produced. The second external air flows out from the second adsorption column (235), flows through the oxygen discharge pipe (245), and is discharged to external space as discharge air.

On the other hand, the second pump mechanism (231b) sucks in air from the first adsorption column (234). In the first adsorption column (234), internal pressure therein is reduced and nitrogen is desorbed from an adsorbent. As a result, in the first adsorption column (234), first external air having a nitrogen concentration that is higher than that of the untreated external air and an oxygen concentration that is lower than that of the untreated external air is produced. The first external air flows into the suck-in pipe (243) from the first adsorption column (234) and is sucked into the second pump mechanism (231b). The second pump mechanism (231b) compresses the sucked-in first external air and discharges it into the supply connection pipe (244). The first external air flows through the supply connection pipe (244) as supply air, and, after merging with air that flows through the supply pipe (120), is supplied into internal space.

-Positive Pressure Maintaining Operation of Controller-

The controller (110) of the present embodiment performs an operation of increasing the rotational speed of the air pump (231). The controller (110) of the present embodiment differs from the controller (110) of the first embodiment on this point.

Specifically, when the determination condition mentioned in describing the first embodiment is established, the controller (110) of the present embodiment determines that external air has entered the transport container (1) due to the air pressure inside the transport container (1) becoming negative, and performs the positive pressure maintaining operation for increasing the flow rate of the first external air that is supplied into the transport container (1) by the first composition adjustment unit (40).

The controller (110) of the present embodiment performs an operation of increasing the rotational speed of the motor (231c) that drives the air pump (231) as the positive pressure maintaining operation. When the rotational speed of the motor (231c) is increased, the rotational speed of the air pump (231) is increased. Then, when the rotational speed of the air pump (231) is increased, the flow rate of the first external air (the supply air) that is supplied into the transport container (1) during the second operation is increased, as a result of which the air pressure inside the transport container (1) is increased.

Other Embodiments

The internal air adjustment device (30) of each of the embodiments above may be modified as follows. The following modifications may be combined or replaced as appropriate as long as the function of the internal air adjustment device (30) is not impaired.

First Modification

The controller (110) provided in the internal air adjustment devices (30) of the first embodiment to the third embodiment may be configured to perform, as the positive pressure maintaining operation, an operation of increasing the opening degree of the second adjustment valve (66) for reducing the flow rate of the second internal air that is discharged to the outside of the transport container (1) when the determination condition is established. The controller (110) may be configured to perform, as the positive pressure maintaining operation, an operation of temporarily maintaining the ventilation exhaust valve (101) in a closed state or an operation of opening and closing the ventilation exhaust valve (101) in a predetermined time interval. In the present modification, by reducing the flow rate of air that is discharged to the outside from the inside of the transport container (1), the air pressure inside the transport container (1) is increased.

Second Modification

In the internal air adjustment devices (30) of the first and second embodiments, the gas separation membranes (85) of the first separation module (41) and the gas separation membranes (85) of the second separation module (61) may have different characteristics.

Third Modification

In the internal air adjustment devices (30) of the first and second embodiments, the first bypass valve (50) may be configured to make it possible to gradually or continuously change the ratio between the flow rate of untreated external air that flows into the first separation module (41) and the flow rate of untreated external air that flows into the first bypass pipe (51). The second bypass valve (70) may be configured to make it possible to gradually or continuously change the ratio between the flow rate of untreated internal air that flows into the second separation module (61) and the flow rate of untreated internal air that flows into the second bypass pipe (71).

Fourth Modification

In the internal air adjustment devices (30) of the first and second embodiments, a driving motor may be coupled to each of the first pump (36) and the second pump (37). In this modification, it is possible to operate one of the first pump (36) and the second pump (37) and stop the other of the first pump (36) and the second pump (37).

Fifth Modification

In the internal air adjustment devices (30) of the first and second embodiments, the first composition adjustment unit (40) and the second composition adjustment unit (60) may be configured to separate sucked-in air into two types of air having different compositions by the PSA (Pressure Swing Adsorption) method. In this case, each composition adjustment unit (40, 60) repeatedly performs a step of producing air having a low nitrogen concentration and high oxygen and high carbon dioxide concentrations by causing nitrogen that is contained in the sucked-in air to be adsorbed onto an adsorbent and a step of producing air having a high nitrogen concentration and low oxygen and low carbon dioxide concentrations by causing nitrogen to be desorbed from an adsorbent.

Sixth Modification

The internal air adjustment devices (30) of the first to third embodiments may be disposed in a fixed refrigerator or freezer. The internal air adjustment device (30) of each of the embodiments above may be provided in a refrigerator/freezer container for land transportation that is transported by, for example, a truck or train. The internal air adjustment device (30) of each of the embodiments above may be provided in a refrigerator/freezer truck in which a box body that defines the load room is integrated with a chassis.

Although embodiments and modifications are described above, it is to be understood that forms and details may be variously changed without departing from the spirit and scope of the claims. The embodiments and the modifications above may be combined or replaced as appropriate without impairing the functionality covered by the present disclosure.

INDUSTRIAL APPLICABILITY

As described above, the present invention is useful for an internal air adjustment device that adjusts the composition of internal air in a storage.

REFERENCE SIGNS LIST 1 transport container (storage)
30 internal air adjustment device
36 first pump
37 second pump
40 first composition adjustment unit
41 first separation module (first separation unit)
46 first adjustment valve (first valve mechanism)
50 first bypass valve (first bypass valve mechanism)
51 first bypass pipe (first bypass passage)
60 second composition adjustment unit
61 second separation module (second separation unit)
66 second adjustment valve (second valve mechanism)
70 second bypass valve (second bypass valve mechanism)
71 second bypass pipe (second bypass passage)
91 oxygen sensor
100 ventilation exhaust pipe (ventilation exhaust passage)
101 ventilation exhaust valve
110 controller
255 bypass connection pipe (first bypass passage)
256 bypass on-off valve (first bypass valve mechanism)

The invention claimed is:

1. An internal air adjustment device that adjusts a composition of internal air existing inside a storage, comprising:
   a first composition adjustment unit that includes a first separation unit that separates external air existing outside the storage into supply air, having a composition that differs from a composition of the external air, and first remaining air, the first composition adjustment unit supplying the supply air into the storage; and
   a second composition adjustment unit that includes a second separation unit that separates internal air existing inside the storage into discharge air, having a composition that differs from the composition of the internal air, and a second remaining air, the second composition adjustment unit discharging the discharge air to outside of the storage,
   wherein the supply air and the second remaining air are supplied to the storage via a common supply pipe.

2. The internal air adjustment device according to claim 1, wherein the first composition adjustment unit supplies the supply air into the storage so that air pressure inside the storage differs from air pressure outside the storage.

3. The internal air adjustment device according to claim 1, wherein the first composition adjustment unit supplies the supply air into the storage so that air pressure inside the storage becomes positive.

4. The internal air adjustment device according to claim 3, wherein a flow rate of the supply air that is supplied into the storage by the first composition adjustment unit is higher than a flow rate of the discharge air that is discharged to the outside of the storage by the second composition adjustment unit.

5. The internal air adjustment device according to claim 1, wherein a carbon dioxide concentration reduction operation of reducing a carbon dioxide concentration of the internal air in the storage is performed by causing the second separation unit of the second composition adjustment unit to separate the discharge air from the internal air existing inside the storage, the discharge air having a carbon dioxide concentration that is higher than the carbon dioxide concentration of the internal air.

6. The internal air adjustment device according to claim 1, wherein an oxygen concentration reduction operation of reducing an oxygen concentration of the internal air in the storage is performed by causing the first separation unit of the first composition adjustment unit to separate the supply air from the external air existing outside the storage and the second separation unit of the second composition adjustment unit to separate the discharge air from the internal air, the supply air having an oxygen concentration that is lower than an oxygen concentration of the external air, the discharge air having an oxygen concentration that is higher than the oxygen concentration of the internal air.

7. An internal air adjustment device that adjusts a composition of internal air existing inside a storage, comprising:
   a first composition adjustment unit that includes a first separation unit that separates supply air from external air existing outside the storage, the supply air having a composition that differs from a composition of the external air, the first composition adjustment unit supplying the supply air into the storage; and
   a second composition adjustment unit that includes a second separation unit that separates discharge air from the internal air existing inside the storage, the discharge air having a composition that differs from the composition of the internal air, the second composition adjustment unit discharging the discharge air to outside of the storage,
   wherein
   an oxygen concentration reduction operation of reducing an oxygen concentration of the internal air in the storage is performed by causing the first separation unit of the first composition adjustment unit to separate the supply air from the external air existing outside the storage and the second separation unit of the second composition adjustment unit to separate the discharge air from the internal air, the supply air having an oxygen concentration that is lower than an oxygen concentration of the external air, the discharge air having an oxygen concentration that is higher than the oxygen concentration of the internal air, and
   the internal air adjustment device includes
   an oxygen sensor that measures the oxygen concentration of the internal air in the storage; and
   a controller that determines whether or not air pressure inside the storage is positive based on a change in a measured value of the oxygen sensor during the oxygen concentration reduction operation, and that, when the controller determines that the air pressure inside the storage is not positive, performs a controlling operation for increasing a flow rate of the supply air that is supplied into the storage by the first composition adjustment unit.

8. The internal air adjustment device according to claim 1, comprising:
- a ventilation exhaust passage for allowing inside and the outside of the storage to communicate with each other; and
- a ventilation exhaust valve that is provided in the ventilation exhaust passage.

9. The internal air adjustment device according to claim 1, wherein the first separation unit separates untreated external air, which is external air introduced from the outside of the storage, into first external air and second external air having different compositions,
- the first composition adjustment unit supplies, as the supply air, one of the first external air and the second external air into the storage and discharges other of the first external air and the second external air, as the first remaining air, to the outside of the storage,
- the second separation unit separates untreated internal air, which is internal air introduced from inside the storage, into first internal air and second internal air having different compositions, and
- the second composition adjustment unit supplies, as the second remaining air, one of the first internal air and the second internal air into the storage and discharges, as the discharge air, other of the first internal air and the second internal air to the outside of the storage.

10. The internal air adjustment device according to claim 9, wherein the first separation unit is configured to separate the untreated external air into first external air having a nitrogen concentration that is higher than a nitrogen concentration of the untreated external air and an oxygen concentration that is lower than an oxygen concentration of the untreated external air and second external air having a nitrogen concentration that is lower than the nitrogen concentration of the untreated external air and an oxygen concentration that is higher than the oxygen concentration of the untreated external air, and
- the second separation unit is configured to separate the untreated internal air into first internal air having a nitrogen concentration that is higher than a nitrogen concentration of the untreated internal air and an oxygen concentration that is lower than an oxygen concentration of the untreated internal air and second internal air having a nitrogen concentration that is lower than the nitrogen concentration of the untreated internal air and an oxygen concentration that is higher than the oxygen concentration of the untreated internal air.

11. The internal air adjustment device according to claim 9, wherein the first separation unit and the second separation unit are each provided with a gas separation membrane where a passing rate of nitrogen is lower than both a passing rate of oxygen and a passing rate of carbon dioxide,
- the first separation unit is configured to bring the untreated external air into contact with the gas separation membrane, cause air that did not pass through the gas separation membrane to be defined as the first external air, and cause air that passed through the gas separation membrane to be defined as the second external air, and
- the second separation unit is configured to bring the untreated internal air into contact with the gas separation membrane, cause air that did not pass through the gas separation membrane to be defined as the first internal air, and cause air that passed through the gas separation membrane to be defined as the second internal air.

12. The internal air adjustment device according to claim 11, wherein the first composition adjustment unit includes a first pump that compresses the untreated external air and supplies the untreated external air to the first separation unit.

13. The internal air adjustment device according to claim 12, wherein the first composition adjustment unit includes a first valve mechanism that is provided at a pipe where the first external air flows, and that has a variable opening degree.

14. The internal air adjustment device according to claim 11, wherein the second composition adjustment unit includes a second pump that compresses the untreated internal air and supplies the untreated internal air to the second separation unit.

15. The internal air adjustment device according to claim 14, wherein the second composition adjustment unit includes a second valve mechanism that is provided at a pipe where the first internal air flows, and that has a variable opening degree.

16. The internal air adjustment device according to claim 9, wherein the first separation unit includes an adsorption unit that is provided with an adsorbent that adsorbs nitrogen,
- the first separation unit is configured to perform an adsorption operation of producing the second first external air by causing nitrogen contained in the untreated external air supplied to the adsorption unit to be adsorbed onto the adsorbent of the adsorption unit, and a desorption operation of producing the first external air by causing nitrogen to be desorbed from the adsorbent of the adsorption unit,
- the second separation unit is provided with a gas separation membrane where a passing rate of nitrogen is lower than both a passing rate of oxygen and a passing rate of carbon dioxide, and
- the second separation unit is configured to bring the untreated internal air into contact with the gas separation membrane, cause air that did not pass through the gas separation membrane to be defined as the first internal air, and cause air that passed through the gas separation membrane to be defined as the second internal air.

17. The internal air adjustment device according to claim 1, wherein the first composition adjustment unit includes
- a first bypass passage for supplying the external air existing outside the storage into the storage by causing the external air to bypass the first separation unit, and
- a first bypass valve mechanism for changing a flow rate of the external air that flows into the first bypass passage.

18. The internal air adjustment device according to claim 1, wherein the second composition adjustment unit includes
- a second bypass passage for supplying the internal air existing inside the storage into the storage by causing the internal air to bypass the second separation unit, and
- a second bypass valve mechanism for changing a flow rate of the internal air that flows into the second bypass passage.

* * * * *